United States Patent [19]
Nishioka et al.

[11] Patent Number: 5,754,656
[45] Date of Patent: May 19, 1998

[54] ELECTRONIC SHOPPING METHOD, ELECTRONIC SHOPPING SYSTEM AND DOCUMENT AUTHENTICATING METHOD RELATING THERETO

[75] Inventors: Mototsugu Nishioka, Kawasaki; Satoshi Miyazaki, Yamato, both of Japan

[73] Assignee: Hitachi, Ltd., Tokyo, Japan

[21] Appl. No.: 690,874

[22] Filed: Aug. 1, 1996

[30] Foreign Application Priority Data

Aug. 4, 1995 [JP] Japan ............... 7-199950

[51] Int. Cl.$^6$ ............... H04L 9/00; H04L 9/30; H04L 9/32
[52] U.S. Cl. ............... 380/25; 380/9; 380/21; 380/23; 380/24; 380/30; 380/49; 380/50; 705/26; 705/35; 705/39; 705/40; 705/44
[58] Field of Search ............... 380/9, 23, 24, 380/25, 49, 50, 59, 21, 29, 30, 46; 235/379, 380; 705/26, 35, 38, 39, 40, 41, 42, 43, 44

[56] References Cited

U.S. PATENT DOCUMENTS

| | | | |
|---|---|---|---|
| 5,416,842 | 5/1995 | Aziz | 380/30 |
| 5,583,940 | 12/1996 | Vidrascu et al. | 380/49 |
| 5,588,060 | 12/1996 | Aziz | 380/30 |
| 5,590,197 | 12/1996 | Chen et al. | 380/24 |
| 5,604,803 | 2/1997 | Aziz | 380/25 |
| 5,633,933 | 5/1997 | Aziz | 380/30 |
| 5,668,877 | 9/1997 | Aziz | 380/30 |

*Primary Examiner*—Bernarr Earl Gregory
*Attorney, Agent, or Firm*—Antonelli, Terry, Stout & Kraus, LLP

[57] ABSTRACT

An electronic shopping method is provided by both an apparatus 10 and an apparatus 30 to hold a key K(A, C) in common, and both the apparatus 30 and an apparatus 40 to hold a key K(B, C) in common. The apparatus 10 transmits a cipher text C1 which is obtained by enciphering a written order P of the products to be purchased using a key K, a cipher text C2 which is obtained by enciphering the key K using the key K(A, C), and authentication information C3 relating to a part P2 of the written order P to the apparatus 30 and the like. The apparatus 40 deciphers the key K on the basis of the cipher text C2, transmits a cipher text C4 which is obtained by enciphering the key K using the key K(B, C) to the apparatus 30. The apparatus 30 deciphers the key K on the basis of the cipher text C4, deciphers the written order P on the basis of the cipher text C1, authenticates the part P2 by referring to the authentication information C3, and transmits a fifth cipher text C5 which is obtained by enciphering the authentication information C3 and the part P2 using the key K(B, C) to the apparatus 40. The apparatus 40 deciphers the part P2, and authenticates the part P2 by referring to the authentication information C3.

11 Claims, 13 Drawing Sheets

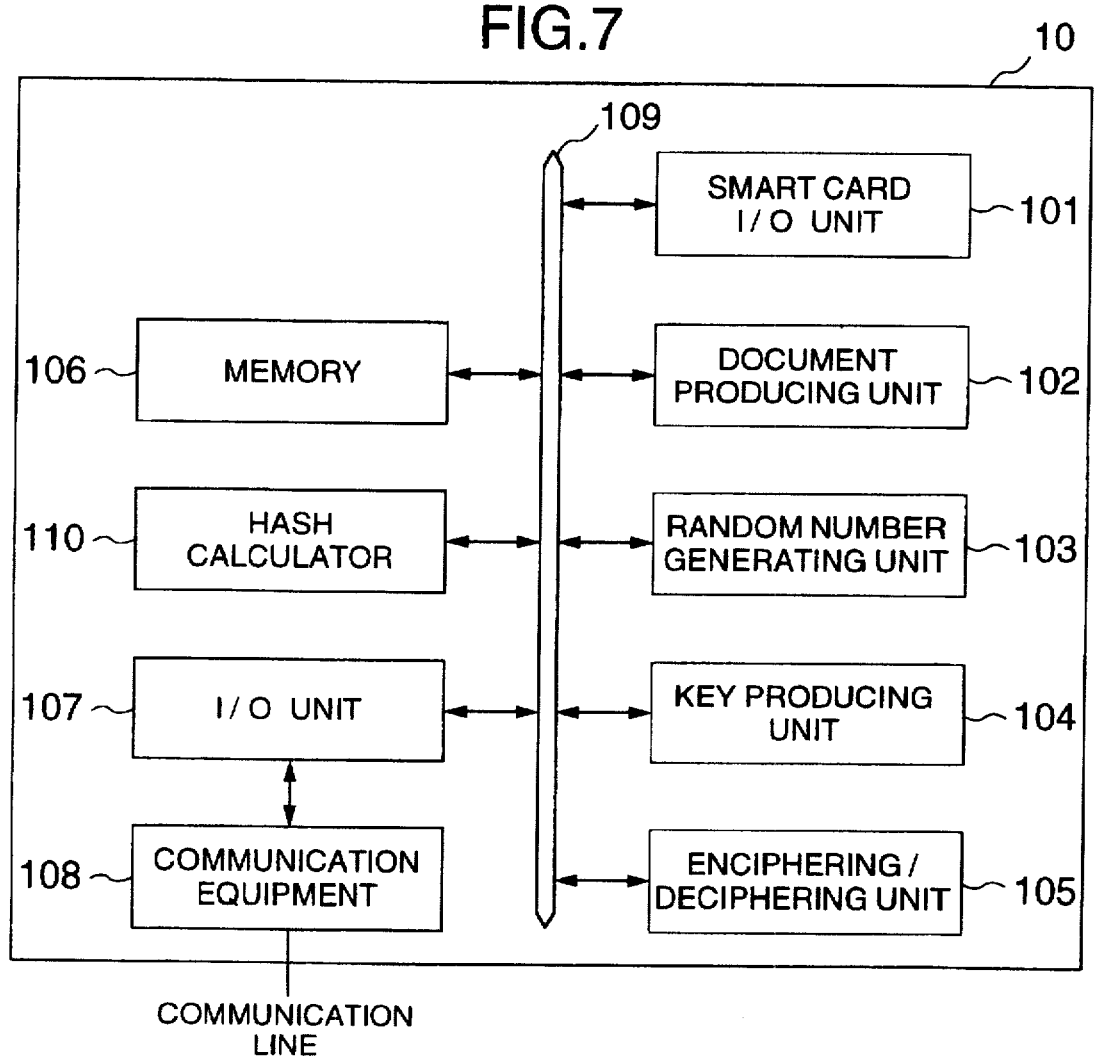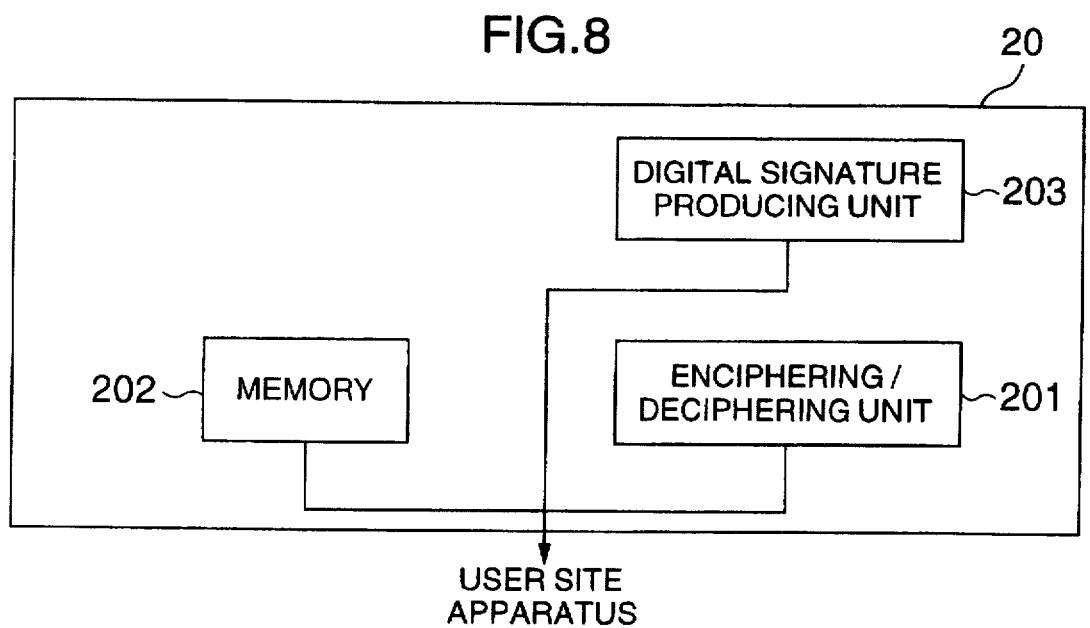

ELECTRONIC SHOPPING METHOD, ELECTRONIC SHOPPING SYSTEM AND DOCUMENT AUTHENTICATING METHOD RELATING THERETO

BACKGROUND OF THE INVENTION

1. Field of the Invention

The present invention relates in general to an electronic shopping system by which an order of products to be purchased by a user and the processing of clearing up a sum of products purchased by the user using a credit card can be safely carried out on a communication network, and more particularly to an electronic shopping method and an electronic shopping system by which an order of products to be purchased by a user and the processing of clearing up a sum of products purchased by the user using a credit card can be safely carried out using a cipher communication method.

2. Description of the Related Art

Until the present time, a large number of cipher communication methods have been proposed. These cipher communication methods are roughly classified into a method in which a key is held in common by utilizing a public key concept and a method in which the public key concept is not employed. For example, as for the method of employing the public key concept, there is well known a key distribution method based on a RSA cipher disclosed in an article of "A Method of Obtaining Digital Signatures and Public Key Cryptosystems" by R. L. Rivest, A. Shamir and L. Adleman, Communication of the ACM, Vol. 21, No 2, pp.120 to 126, 1978, or public key distribution method disclosed in an article of "New Directions in Cryptology" by W. Diffice and M. Hellman, IEEE Transaction of the Information Theory, Vol. IT-22, No. 6, pp.644 to 654, 1976.

On the other hand, as for a method of not employing the public key concept, as disclosed in "ISO/IEC DIS 11770-2", pp. 1–23 there is well known a method including the following steps.

For example, it is assumed that three entities A, B and C are present on a communication network, and the entities A and C hold a key $K(A, C)$ in common, and the entities B and C hold a key $K(B, C)$ in common. In this connection, the entity C is assumed to be sufficiently reliable.

Step 1: Firstly, the entity A selects a key K at random, and then calculates a cipher text C (P) which has been obtained by enciphering a document P to be notified using the key K, i.e., $C(P)=E(K: P)$. Now, $E(K: P)$ shows the result of enciphering the document P using the key K. In addition, the entity A calculates a cipher text C(K) which has been obtained by enciphering the key K using the key $K(A, C)$, i.e., $C(K)=E(K(A, C): K)$. Both C (P) and C(K) thus obtained are transmitted to the entity B through a communication network.

Step 2: The entity B transmits C(K) which has been supplied thereto through the communication network to the entity C.

Step 3: The entity C deciphers the key K using the key $K(A, C)$ on the basis of $K=D(K(A, C): C(P))$. Now, $D(K: P)$ shows the result of deciphering the document P using the key K. Next, the entity C calculates a cipher text C' (K) which has been obtained by enciphering the deciphered key using the key $K(B, C)$, i.e., $C'(K)=E(K(B, C): K)$, and then transmits the resultant C'(K) to the entity B.

Step 4: The entity B deciphers the key K from C'(K) using the key $K(B, C)$ on the basis of $K=D(K(B, C): C'(K))$, and then deciphers the document P using the key K on the basis of $P=D(K: C(K))$.

In such a way, the entity B can obtain the contents of the document P.

A large number of cipher communication methods as described above have been proposed. If employing any one of those methods, an electronic shopping system can be designed which is such that by utilizing the communication network, a user purchases desired products from a retail store, and requests a credit card company of its payment. For example, in the above-mentioned method of not employing the public key, the user, the retail store, the credit card company, and the document may be made correspond to the entities A, B, C and a written order of the products to be purchased by the user, respectively.

According to a sort of electronic shopping system, in general, the user can order safely surely the desired products and also request the credit card company of its payment.

In the above-mentioned electronic shopping system, however, for example, there is a possibility that the following problem arises. That is, there is a possibility that since the credit card company can not authenticate the legality of the user, the retail store produces the false written order to send it to the credit card company.

In addition, there may be a case where the user does not desire that the contents of the products purchased by himself/herself become known to the credit card company. However, in the above-mentioned electronic shopping system, it is impossible that out of the contents of the document P corresponding to the written order, for example, only the information relating to the purchased products is not made become known to the credit card company.

SUMMARY OF THE INVENTION

In view of the foregoing problems associated with the prior art, it is therefore an object of the present invention to provide an electronic shopping method and an electronic shopping system by which a credit card company can authenticate the legality of a user and the legality of a sum of products purchased by the user on the basis of information sent from a retail store.

In addition, it is another object of the present invention to provide an electronic shopping method and an electronic shopping system which are designed in such a way that information relating to the products purchased by a user can become known to only a retail store, and also a credit card company can not become aware of only information, including information relating to a sum of purchased products, required for clearing up a sum of purchased products.

The above-mentioned objects of the present invention are attained by the provision of an electronic shopping method in which by using a communication network to which a first apparatus for being operated by a user, a second apparatus associated with a retail store for providing information with respect to products to be purchased by the user, and a third apparatus associated with a credit card company for paying the prices for the products purchased by the user are connected, the user operates the first apparatus so as to transmit a written order that the user purchases the desired products to the second apparatus, and the second apparatus transmits at least predetermined information of the written order of interest to the third apparatus, the method including that:

both the first apparatus and the third apparatus hold a first key in common, and both the second apparatus and the third apparatus hold a second key in common;

the first apparatus calculates a first cipher text which is obtained by enciphering the written order exhibiting the products to be purchased using a third key selected at random, a second cipher text which is obtained by enciphering the third key using the first key, and authentication information relating to at least a predetermined part of the written order, and then transmits the first cipher text, the second cipher text and the authentication information to the second apparatus through the communication network;

the second apparatus transmits the second cipher text to the third apparatus;

the third apparatus deciphers the third key using the first key on the basis of the second cipher text, and calculates a third cipher text which is obtained by enciphering the resultant third key using the second key, and then transmits the third cipher text to the second apparatus through the communication network;

the second apparatus deciphers the third key using the second key on the basis of the third cipher text, and also deciphers the written order using the resultant third key on the basis of the first cipher text, and authenticates the predetermined part of the written order by referring to the authentication information, and calculates a four cipher text which is obtained by enciphering the predetermined part of the written order using the second key, and then transmits both the authentication information and the fourth cipher text to the third apparatus; and the third apparatus deciphers the predetermined part of the written order using the second key on the basis of the fourth cipher text, and authenticates the predetermined part of the written order by referring to the authentication information.

In a first aspect of the present invention, the predetermined information of the written order is information to be notified to the credit card company, and the authentication information corresponds to a fifth cipher text which is obtained by enciphering the predetermined information using the first key by the first apparatus, and the third apparatus deciphers the predetermined information from the fourth cipher text using the second key, and also deciphers the predetermined information from the fifth cipher text using the first key, and judges whether or not the resultant two predetermined information matches each other, thereby authenticating the predetermined part of the written order.

In a second aspect of the present invention, both the first apparatus and the third apparatus hold a first key in common, and both the second apparatus and the third apparatus hold a second key in common;

the first apparatus calculates a first cipher text which is obtained by enciphering the written order exhibiting the products to be purchased using a third key selected at random, a digital signature for the written order carried out by using a secret key of the first apparatus, and a second cipher text which is obtained by enciphering the third key using the first key, and then transmits the first cipher text, the digital signature and the second cipher text to the second apparatus through the communication network;

the second apparatus transmits the second cipher text to the third apparatus;

the third apparatus deciphers the third key using the first key on the basis of the second cipher text, and calculates a third cipher text which is obtained by enciphering the resultant third key using the second key, and then transmits the third cipher text to the second apparatus through the communication network;

the second apparatus deciphers the third key using the second key on the basis of the third cipher text, and also deciphers the written order using the resultant third key on the basis of the first cipher text, and confirms the legality of the digital signature using a public key associated with the first apparatus, thereby authenticating the written order, and calculates a fourth cipher text which is obtained by enciphering the written order using the second key, and then transmits both the digital signature and the fourth cipher text to the third apparatus; and the third apparatus deciphers the written order using the second key on the basis of the fourth cipher text, and confirms the legality of the digital signature using the public key associated with the first apparatus, thereby authenticating the written order.

In addition, in a third aspect of the present invention, both the first apparatus and the third apparatus hold a first key in common, and both the second apparatus and the third apparatus hold a second key in common;

the first apparatus calculates a first cipher text which is obtained by enciphering a third key selected at random using first information which is obtained by only the first apparatus, and then transmits the first cipher text to the second apparatus through the communication network;

the second apparatus calculates a second cipher text which is obtained by enciphering the first cipher text using second information which is obtained by only the second apparatus, and then transmits the second cipher text to the first apparatus;

the first apparatus calculates a third cipher text which is obtained by enciphering the written order exhibiting the products to be purchased using the first key, a fourth cipher text which is obtained by enciphering a cipher text, from which the influence of the first information is removed, using the first key, and a fifth cipher text which is obtained by enciphering at least predetermined information in the written order using the second key, and then transmits the third cipher text, the fourth cipher text and the fifth cipher text to the second apparatus through the communication network;

the second apparatus transmits the fourth cipher text to the third apparatus;

the third apparatus calculates a sixth cipher text, from which the influence of the first key is removed, from the fourth cipher text, and then transmits the sixth cipher text thus obtained to the second apparatus;

the second apparatus deciphers the third key by removing the influence of the second information on the basis of the sixth cipher text, and also deciphers the written order using the resultant third key on the basis of the third information, and calculates a seventh cipher text which is obtained by enciphering predetermined information in the written order using the second key, and then transmits both the fifth cipher text and the seventh cipher text to the third apparatus; and the third apparatus deciphers the predetermined information using the second key on the basis of the seventh cipher text and also deciphers the predetermined information using the first key on the basis of the fifth information, and judges whether or not the resultant predetermined two information matches each other, thereby authenticating the predetermined part in the written order.

In addition, in a fourth aspect of the present invention, both the first apparatus and the third apparatus hold a first key in common, and both the second apparatus and the third apparatus hold a second key in common;

the first apparatus calculates a first cipher text which is obtained by enciphering a third key selected at random using first information which is obtained by only the first apparatus, and then transmits the first cipher text thus obtained to the second apparatus through the communication network;

the second apparatus calculates a second cipher text which is obtained by enciphering the first cipher text using second information which is obtained by only the second apparatus, and then transmits the second cipher text thus obtained to the first apparatus;

the first apparatus calculates a third cipher text C3 which is obtained by enciphering the written order P=(P1, P2) including information P2 to be notified to a credit card company and information P1 other than the information P2 using the third key, and a fourth cipher text C4 which is obtained by enciphering a cipher text, which is obtained by removing the influence of the first information from the second cipher text C2, using the first key, and on the basis of a hash value f(h(P1), P2) which is calculated using both one way hash functions h(x) and f(x, y) as public information, and calculates a digital signature sgnA(P) for the hash value f(h(P1), P2) using a secret key associated with the first apparatus, and then transmits the third cipher text C3, the fourth cipher text C4 and the digital signature sgnA(P) to the second apparatus through the communication network;

the second apparatus transmits the fourth cipher text C4 to the third apparatus;

the third apparatus calculates a fifth cipher text C5 which is obtained by removing the influence of the first key from the fourth cipher text, and then transmits the fifth cipher text thus obtained to the second apparatus;

the second apparatus deciphers the third key by removing the influence of the second information on the basis of the fifth cipher text, and also deciphers the written order P using the resultant third key on the basis of the third information, and confirms the legality of the digital signature sgnA(P) using a public key associated with the first apparatus, thereby authenticating the written order P, and calculates a sixth cipher text C6 which is obtained by enciphering predetermined information P2 in the written order using the second key, and then transmits the sixth cipher text, the digital signature sgnA(P) and the hash value h(P1) to the third apparatus; and the third apparatus deciphers the predetermined information P2 in the written order using the second key on the basis of the sixth cipher text, and confirms the legality of the digital signature sgnA(P) using the public key associated with the first apparatus, the hash value h(P1) and the predetermined information P2 in the written order, thereby authenticating the second information in the written order.

In a fifth aspect of the present invention, both the second apparatus and the third apparatus hold a second key in common;

the first apparatus calculates a first cipher text u which is obtained by enciphering a third key K, which is selected at random so as to fulfill the condition of $0 \leq K < p$ using first information as a first random number r fulfilling the condition of $0 \leq r < p-1$ on the basis of an expression of u=exp(K: r) mod p where exp(a: x) represents a to the x-th power, and then transmits the first cipher text to the second apparatus through the communication network;

the second apparatus calculates a second cipher text v which is obtained by enciphering the first cipher text using second information as a second random number s fulfilling the condition of $0 \leq s < p$ on the basis of an expression of v=exp(u: s) mod p, and then transmits the second cipher text to the first apparatus;

the first apparatus calculates a third cipher text C3 which is obtained by enciphering the written order P=(P1, P2) including predetermined information P2 to be notified to a credit card company and information P1 other than the predetermined information P2 using the third key, and a fourth cipher text w which is obtained by removing the influence of the first information from the second cipher text on the basis of an expression of w=exp(v: 1/r) mod p, and on the basis of a hash value g(f(h(P1), P2), v, I) which is calculated using the second cipher text v, identification information I and one way hash functions h(x), f(x, y) and g(x, y, z) as public information, and calculates a digital signature sgnA(P) for the hash value g(f(h(P1), P2), v, I) using a secret key associated with the first apparatus, and then transmits the fourth cipher text, the identification information and the digital signature to the second apparatus through the communication network;

the second apparatus deciphers the third key on the basis of an expression of K=exp(w: 1/s) mod p, and also deciphers the written order using the resultant third key, and confirms the legality of the digital signature sgnA (P) using a public key associated with the first apparatus, thereby authenticating the written order P, and calculates a fifth cipher text which is obtained by enciphering the predetermined information P2 in the written order using the second key, and then transmits the fifth cipher text, the digital signature sgnA(P), the hash value h(P1) and the identification information I to the third apparatus; and the third apparatus deciphers the predetermined information P2 in the written order using the second key on the basis of the fifth cipher text, and confirms the legality of the digital signature sgnA(P) using the public key associated with the first apparatus, the hash value h(P1), and the predetermined information P2 in the written order, thereby authenticating the predetermined information in the written order.

In a sixth aspect of the present invention, both the second apparatus and the third apparatus hold a second key in common;

the first apparatus calculates a first cipher text which is obtained by enciphering the written order P=(P1, P2) including predetermined information P2 to be notified to the credit card company and information P1 other than the predetermined information P2 using a third key selected at random and calculates a second cipher text w, which is defined by an expression of w=exp(K: eB) mod nB where exp(a: x) represents a to the x-th power, using a public key (eB, nB) associated with the second apparatus, and also calculates a digital signature sgnA(P) for a hash value f(h(P1), P2) using one way hash functions h(x) and f(x, y) as the public information and a secret key dA and a public key nA associated with the first apparatus in accordance with an expression of sgnA(P)=exp(f(h(P1), P2), dA) mod nA, and then transmits the resultant first cipher text, second cipher text and digital signature sgnA(P) to the second apparatus through the communication network;

the second apparatus deciphers the third key using a secret key dB associated with the second apparatus in accordance with an expression of K=exp(w: dB) mod nB, and also deciphers a document P using the resultant third key on the basis of the first cipher text, and confirms that an expression of f(h(P1), P2)=exp(sgnA (P): eA)(mod nA) is established using a public key (eA, nA) associated with the first apparatus, thereby authenticating the document P, and calculates a third cipher text which is obtained by enciphering predetermined information in the document P using the second key, and then transmits the third cipher text, the hash value h(P1) and the digital signature sgnA(P) to the third apparatus; and the third apparatus deciphers the predetermined information in the written order using the second key on the basis of the third cipher text, and confirms that an expression of f(h(P1), P2)=exp(sgnA(P): eA)(mod nA) is established using the public key (eA, nA) associated with the first apparatus, thereby authenticating the predetermined information in the written order.

According to the present invention, since both the second apparatus and the third apparatus can authenticate the legality of at least the predetermined part of the document on the basis of the authentication information, it is possible to carry out the authentication in which the legality of the information relating to the user can be surely authenticated.

In addition, according to the first aspect and the third to sixth aspects of the present invention, since only the information to be notified to the third apparatus is transmitted thereto, the user can purchase the desired products without being aware of the unnecessary information by the credit card company.

Further, according to the third aspect of the present invention, since the document can be authenticated without producing the digital signature, the processing time in the first apparatus can be further shortened.

In addition, the fourth and fifth aspects of the present invention, for the written order P=(P1, P2), the predetermined hash value is calculated using the one way hash functions as the public information, and the digital signature for the hash value of interest is produced using the secret key associated with the first apparatus. Next, in the second apparatus, on the basis of the public key associated with the first apparatus and the written order, the legality of the digital signature sgnA(P) is confirmed, thereby authenticating the written order, and also in the third apparatus, on the basis of the public key associated with the first apparatus, the hash value and the predetermined information in the written order, the legality of the digital signature sgnA(P) is confirmed, thereby authenticating the predetermined part. Therefore, since the credit card company is notified of only the predetermined information, privacy of the user is protected, and also once the digital signature is produced, it is possible to authenticate both the written order and the predetermined information contained therein, and hence a burden imposed on the calculation processing of the first apparatus is lightened.

BRIEF DESCRIPTION OF THE DRAWINGS

FIG. 7 is a block diagram showing a configuration of a user site apparatus according to a second embodiment of the present invention;

FIG. 8 is a block diagram showing a configuration of a smart card according to the second embodiment;

DESCRIPTION OF THE PREFERRED EMBODIMENTS

The preferred embodiments of the present invention will hereinafter be described in detail with reference to the accompanying drawings.

Figure 1:
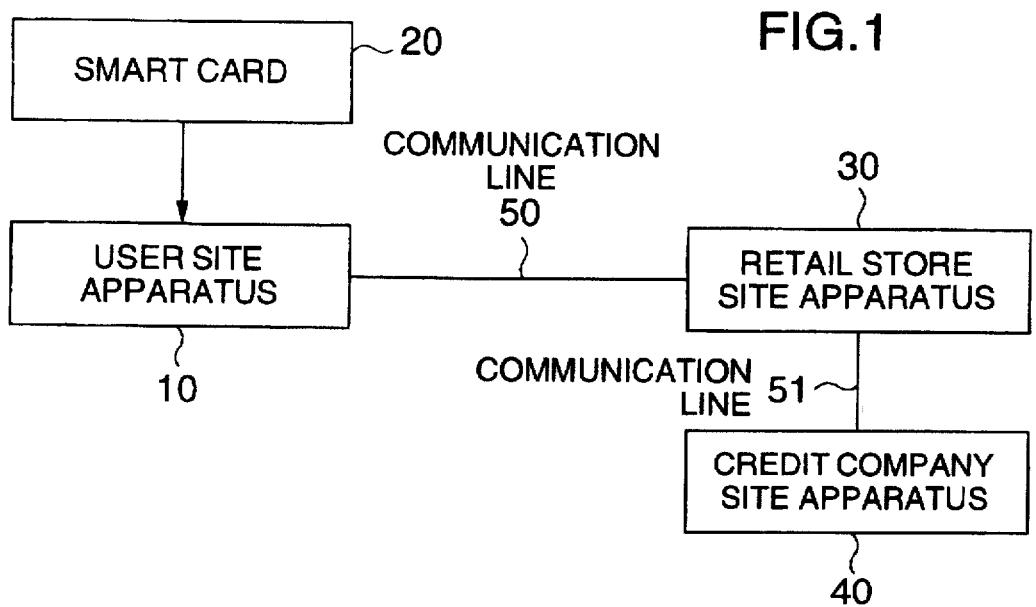
FIG. 1 is a block diagram showing a configuration of an electronic shopping system according to an embodiment of the present invention.

FIG. 1 is a block diagram showing a configuration of an electronic shopping system according to an embodiment of the present invention. As shown in FIG. 1, the present system includes a user site apparatus 10 which is operated by a user who intends to purchase desired products, a smart card 20 which the user possesses, a retail store site apparatus 30 which is installed in a retail store in order to introduce various products to the user and to receive the information exhibiting the products to be purchased by the user, and a credit card company site apparatus 40 which is installed in a credit card company. The user site apparatus 10 is connected to the retail store site apparatus 30 through a communication line 50, and the retail store site apparatus 30 is connected to the credit card company site apparatus 40 through a communication line 51.

The user site apparatus 10 corresponds to a terminal or the like for example which the user possesses. Then, the user inserts his/her smart card 20 into a slot (not shown) or the like which is provided in the user site apparatus 10, thereby connecting the smart card 20 to the user site apparatus 10. Therefore, the user operates an input unit (not shown) of the user site apparatus 10 in order to issue a command for purchasing the desired products, i.e., an order of the desired products to be purchased to the retail store site apparatus 30 through the communication line 50. On receiving the order of the desired products to be purchased, the retail store site apparatus 30 requests the credit card company site apparatus 40 to clear up a sum of products which have been purchased by the user through the communication line 51. Each of the apparatuses constituting the present embodiment will hereinbelow be described in more detail.

Figure 2:
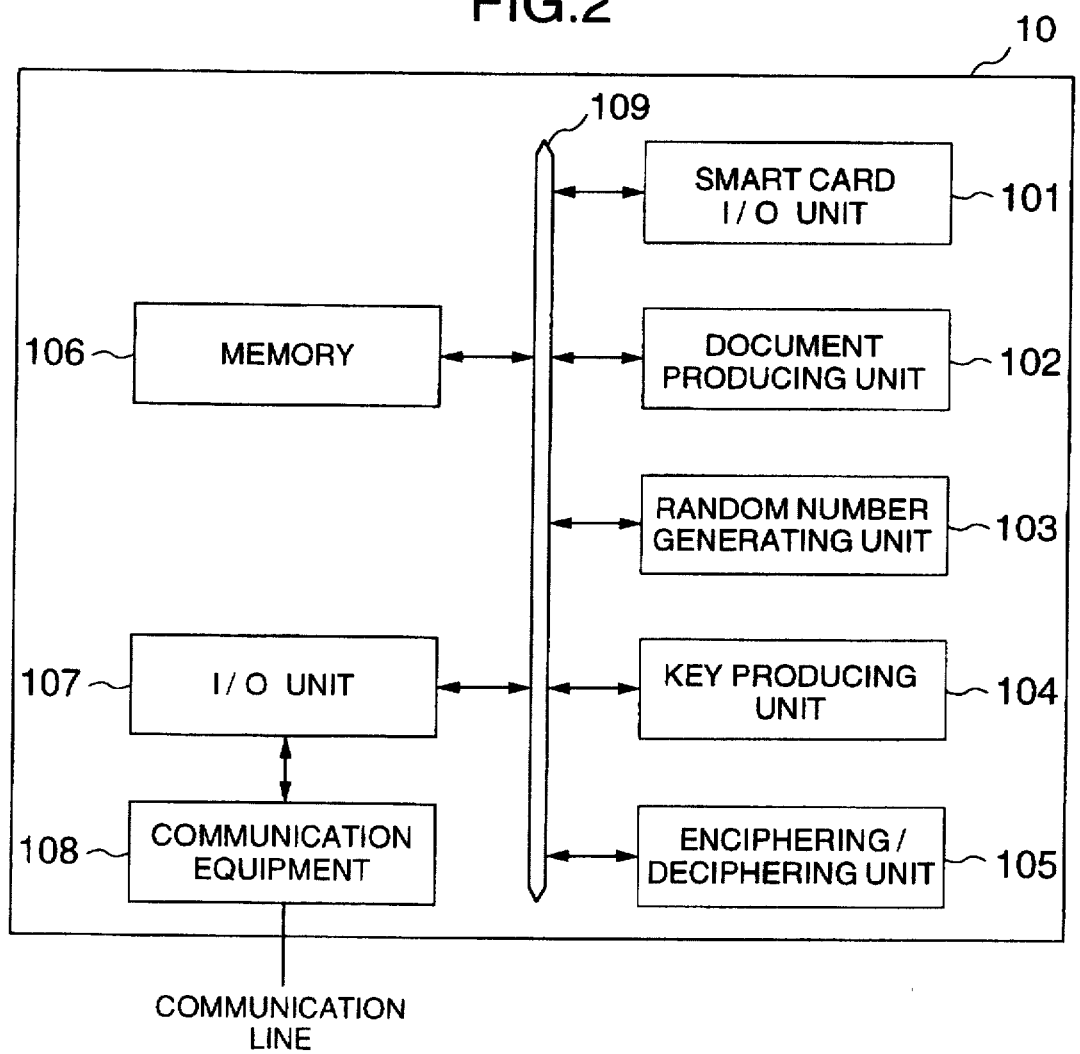
FIG. 2 is a block diagram showing a configuration of a user site apparatus according to a first embodiment of the present invention.

FIG. 2 is a block diagram showing a configuration of the user site apparatus 10 according to the present embodiment. As shown in FIG. 2, the user site apparatus 10 includes: a smart card input/output unit 101 for receiving the smart card 20 and transmitting/receiving data to/from the smart card 20; a document producing unit 102 for producing a document such as a written order of products to be purchased as will be described later; a random number generating unit 103 for generating a random number; a key producing unit 104 for producing a predetermined key on the basis of the random number generated by the random number generating unit 103; an enciphering/deciphering unit 105 for enciphering a document or deciphering the enciphered document into the original document using a key or the like obtained from the key producing unit 104; a memory 106; an input/output unit 107 for controlling an input/output operation of the user site apparatus 10; and communication equipment 108 connected to the communication line 50 for transmitting/receiving the data to/from the retail store site apparatus 30. In addition, the smart card input/output unit 101 to the input/output unit 107 are respectively connected to a data bus 109.

Figure 3:
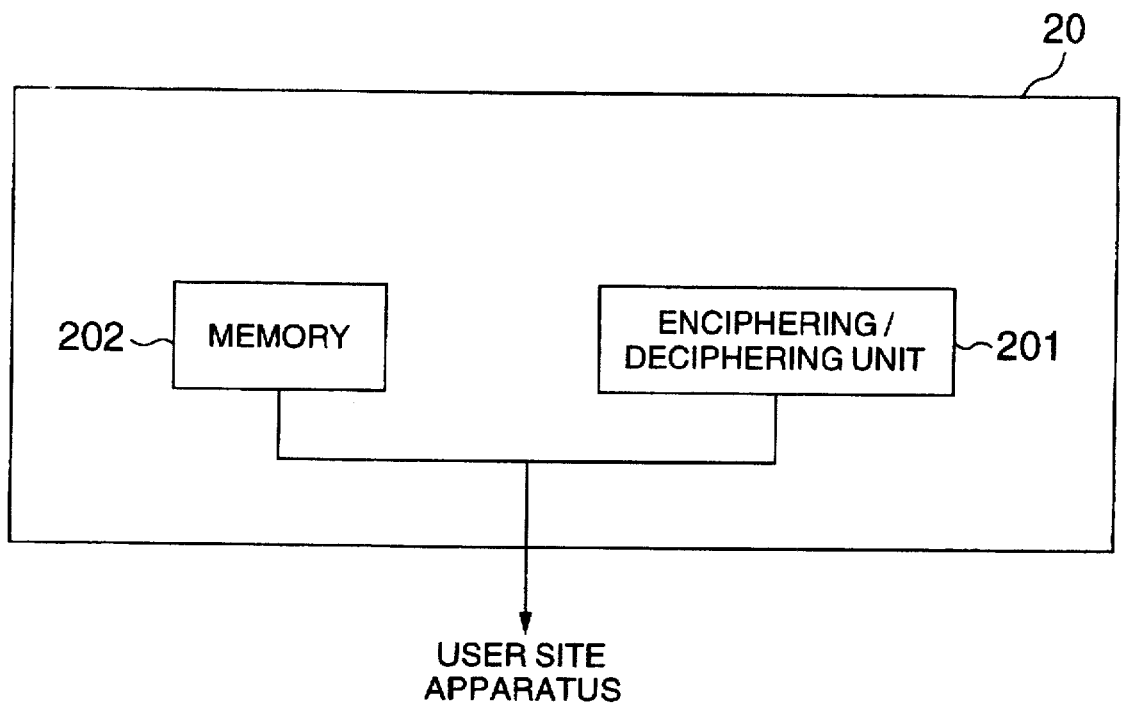
FIG. 3 is a block diagram showing a configuration of a smart card according to the first embodiment.

FIG. 3 is a block diagram showing an internal configuration of the smart card 20 according to the present embodiment. As shown in FIG. 3, the smart card 20 includes an enciphering/deciphering unit 201 and a memory 202. At the time when the smart card 20 has been inserted into the slot (not shown) of the user site apparatus 10, both the enciphering/deciphering unit 201 and the memory 202 of the smart card 20 are connected to the smart card input/output unit 101 through a connector (not shown).

Figure 4:
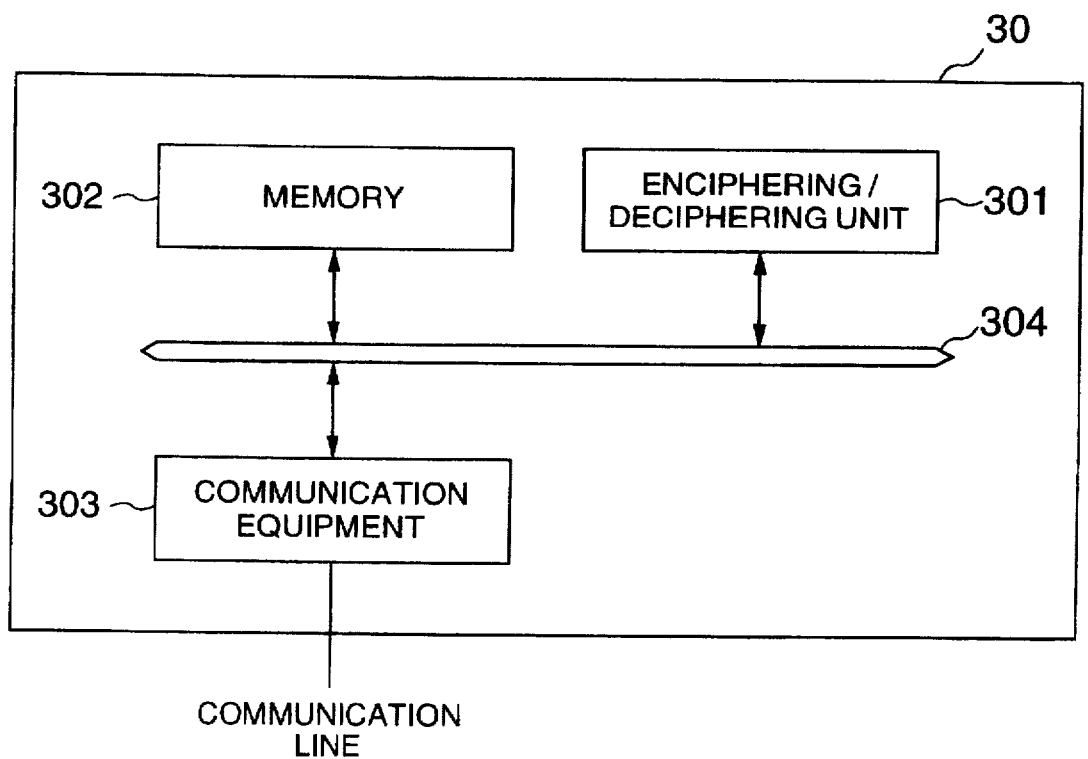
FIG. 4 is a block diagram showing a configuration of a retail store site apparatus according to the first embodiment.

FIG. 4 is a block diagram showing an internal configuration of the retail store site apparatus 30 according to the present embodiment. As shown in FIG. 4, the retail store site apparatus 30 includes an enciphering/deciphering unit 301, a memory 302, a random number generating unit 303 and communication equipment 304.

Figure 5:
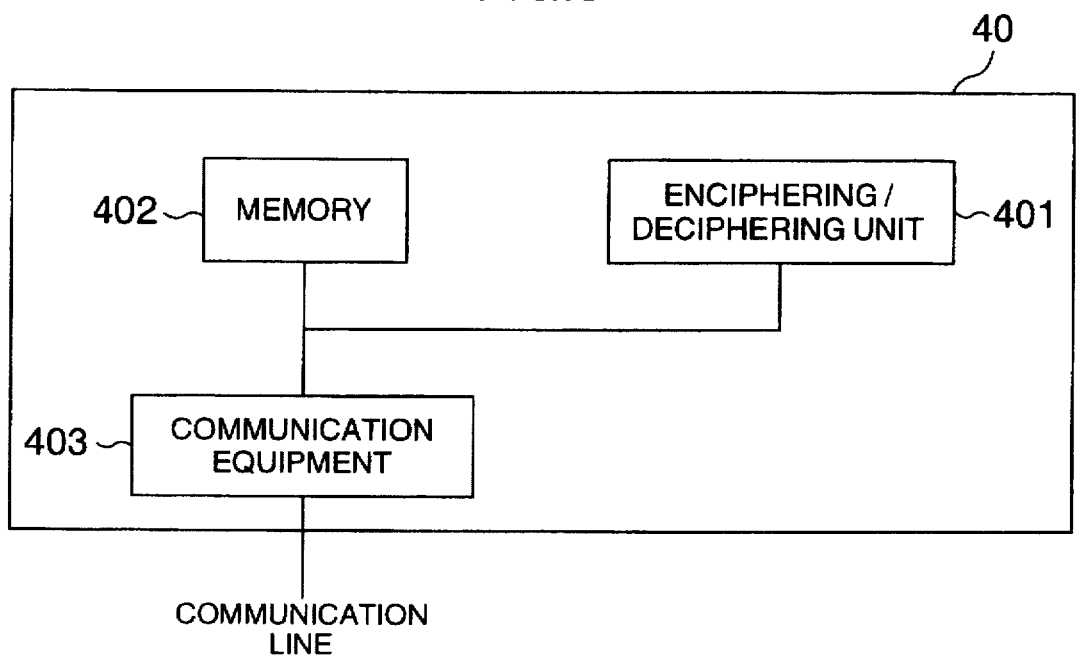
FIG. 5 is a block diagram showing a configuration of a credit card company site apparatus according to the first embodiment.

FIG. 5 is a block diagram showing an internal configuration of the credit card company site apparatus 40 according to the present embodiment. As shown in FIG. 5, the credit card company site apparatus 40 includes an enciphering/deciphering unit 401, a memory 402 and communication equipment 403.

Figure 6:
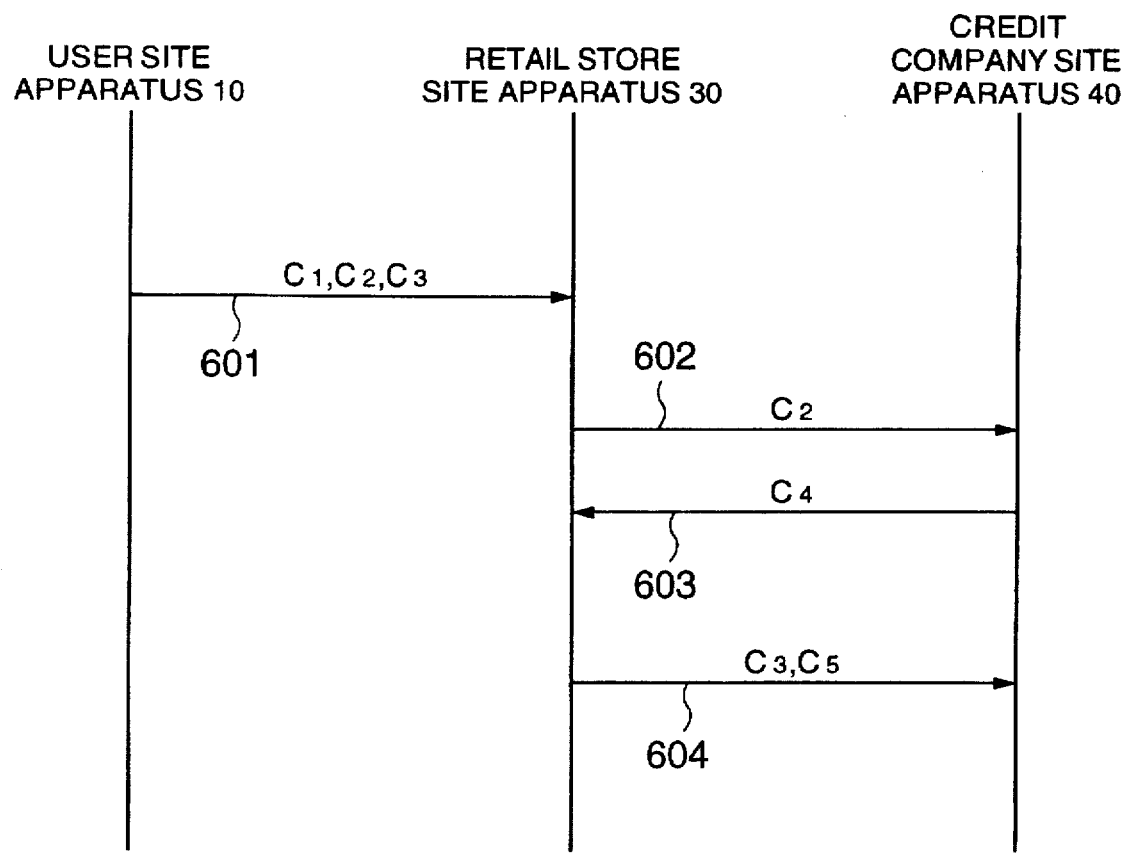
FIG. 6 is a schematic view useful in explaining transmission of information in the electronic shopping system according to the first embodiment.

Next, the description will hereinbelow be given with respect to the operation of the electronic shopping system configured as described above. FIG. 6 is a schematic view useful in explaining transmission of information in the electronic shopping system according to the present embodiment.

In the present embodiment, a credit card company C is assumed to be reliable. In addition, the present embodiment is designed in such a way that a retail store B can authenticate the information including a sum of products purchased by a user A without carrying out the key distribution based on the public key concept and also using a digital signature as will be described later.

Further, in the present embodiment, both the smart card 20 of the user A and the retail store site apparatus 30 hold previously the same key K(A, B), and also both the retail store site apparatus 30 and the credit card company site apparatus 40 hold previously the same key K(B, C). That is, the information relating to the key K(A, B) is previously stored in each of a predetermined storage area of the memory 202 of the smart card 20 and a predetermined storage area of the memory 302 of the retail store site apparatus 30, and also the information relating to the key K(B, C) is previously stored in each of a predetermined storage area of the memory 302 of the retail store site apparatus 30 and a predetermined storage area of the memory 402 of the credit card company site apparatus 40.

1) Firstly, a user A inserts the smart card 20 which the user possesses into the slot (not shown) of the user site apparatus 10. As a result, the enciphering/deciphering unit 201 and the like constituting the smart card 20 are connected to the smart card input/output unit 101. Next, the user selects desired products by referring to the information relating to the various products (kinds of products, product names, prices of products, or the like) which is, for example, supplied from the retail store site apparatus 30 and is displayed on a display device (not shown) of the user site apparatus 10.

Then, the user operates an input unit (not shown) such as a keyboard of the user site apparatus 10 in order to activate the document producing unit 102 to produce a predetermined written order P=(P1, P2). In this connection, P1 contained in the document P is a part corresponding to the contents of an order given to the retail store, and P2 contained therein is a part corresponding to the information, including a credit card number and a sum of purchased products, to be sent to the credit card company C.

Next, the key producing unit 104 of the user site apparatus 10 produces the key K on the basis of the random number generated by the random number generating unit 103, and then the enciphering/deciphering unit 105 produces a cipher C1, which is defined by the following expression, on the basis of the key K thus produced.

$C1=E(K: P)$ where E(K: P) represents the result of enciphering the document P using the key K (by a secret key cryptosystem). The cipher C1 thus obtained is then transmitted to the communication equipment 108 through the input/output unit 107.

In addition, the user site apparatus 10 outputs both the key K and the part P2 of the document P to the smart card 20 through the smart card input/output unit 101. Then, the smart card 20 reads out a key K(A, C) which is previously stored in the memory 202, and the enciphering/deciphering unit 201 produces both ciphers C2 and C3, which are respectively defined by the following expression, using the key K(A, C) thus read out.

$$C2=E(K(A, C): K)$$

$$C3=E(K(A, C): P2)$$

Both the ciphers C2 and C3 thus obtained are supplied to the smart card input/output unit 101, and then are transmitted to the communication equipment 108 through the input/output unit 107.

In addition, the communication equipment 108 transmits the ciphers C1, C2 and C3 to the retail store site apparatus 30 through the communication line 50 (refer to reference numeral 601 in FIG. 6).

2) After having received the ciphers C1, C2 and C3, the communication equipment 304 of the retail store site apparatus 30 transmits only the cipher C2, out of them, to the credit card company site apparatus 40 through the communication line 51 (refer to reference numeral 602 in FIG. 6).

3) After having received the cipher C2 which had been transmitted by the retail store site apparatus 30, the credit card company site apparatus 40 reads out the key K(A, C) which is previously stored in the memory 402, and the enciphering/deciphering unit 401 deciphers the key A using the key K(A, C) thus read out on the basis of the following expression.

$$K=D(K(A, C): C2)$$

where D(A: P) represents the result of deciphering the document P using the key K (by the secret key cryptosystem).

Subsequently, the credit card company site apparatus 40 reads out the key K(B, C) which is previously stored in the memory 402, and then produces a cipher C4, which is defined by the following expression, using the enciphering/deciphering unit 401.

$$C4=E(K(B, C): K)$$

The cipher C4 thus produced is supplied to the communication equipment 402, and then the communication equipment 402 transmits the cipher C4 to the retail store site apparatus 30 through the communication line 51 (refer to reference numeral 603 in FIG. 6).

4) After having received the cipher C4 which had been transmitted by the credit card company site apparatus 40, the retail store site apparatus 30 reads out the key K(B, C) which is previously stored in the memory 302, and then the enciphering/deciphering unit 301 deciphers the key K using the key K(B, C) thus read out on the basis of the following expression.

$$K=D(K(B, C): K)$$

Further, the enciphering/deciphering unit 301 deciphers the written order P on the basis of the following expression.

$$P=D(K: C1)$$

Thereafter, the enciphering/deciphering unit 301 of the retail store site apparatus 30 enciphers the predetermined information P2 in the written order P, which is a part corresponding to the information to be sent to the credit card company C, using the key K(B, C) so as to produce a cipher C5 which is defined by the following expression.

$$C5=E(K(B, C): P2)$$

Both the cipher C5 thus obtained and the cipher C3 are supplied to the communication equipment 304, and then the communication equipment 304 transmits these ciphers to the credit card company site apparatus 40 through the communication line 51 (refer to reference numeral 604 in FIG. 6).

5) After the credit card company site apparatus 40 has received both the ciphers C3 and C5, the enciphering/deciphering unit 401 deciphers the part P2 in the written order P using the key K(A, C) or the key K(B, C), respectively. After having obtained the two parts P2 using the two keys in such a way, it is judged whether or not the two parts P2 match each other, thereby authenticating the part P2. In the case where the two parts P2 match each other, it is judged that the order of the products is given by the legal user.

As described above, according to the present embodiment, the legality of an order given by the user can be authenticated, and also out of the written order produced by the user, only the information which the credit card company should become aware of can be transmitted to the credit card company.

Next, the description will hereinbelow be given with respect to an electronic shopping system according to a second embodiment of the present invention.

In the second embodiment, the credit card company is assumed to be reliable. In addition, the second embodiment is designed in such a way that the authentication of the user is carried out using the digital signature without carrying out the key distribution based on the public key concept.

FIGS. 7 to 10 are respectively block diagram showing configurations of a user site apparatus 10, a smart card 20, a retail store site apparatus 30 and a credit card company site apparatus 40 according to the second embodiment of the present invention.

As shown in FIG. 7, the user site apparatus 10 according to the second embodiment includes, in addition to the elements 101 to 108 of the first embodiment shown in FIG. 2, a hash calculator 110 for calculating a hash value of a predetermined part in the document. As shown in FIG. 8, the smart card 20 of the second embodiment includes, in addition to the elements 201 and 202 of the first embodiment shown in FIG. 3, a digital signature producing unit 203 for producing a digital signature as will be described later.

Figure 9:
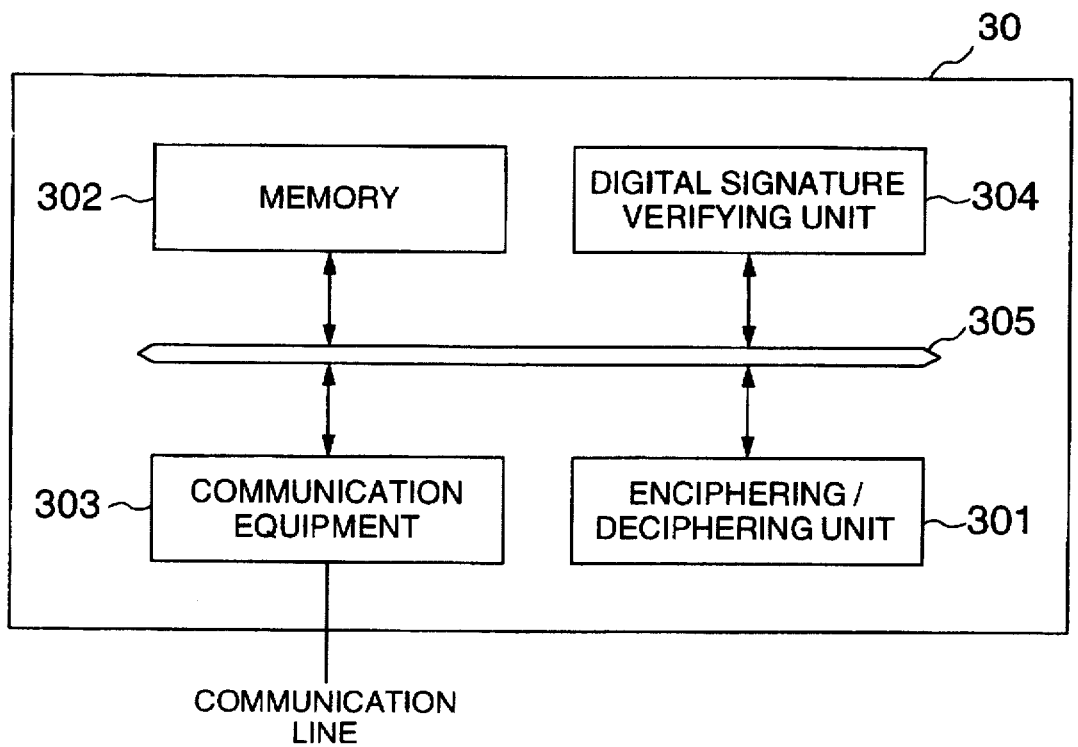
FIG. 9 is a block diagram showing a configuration of a retail store site apparatus according to the second embodiment.

In addition, as shown in FIG. 9, the retail store site apparatus 30 of the second embodiment includes, in addition to the elements 301 to 303 of the first embodiment shown in FIG. 4, a digital signature verifying unit 304 for verifying the legality of a digital signature produced in the user side.

Figure 10:
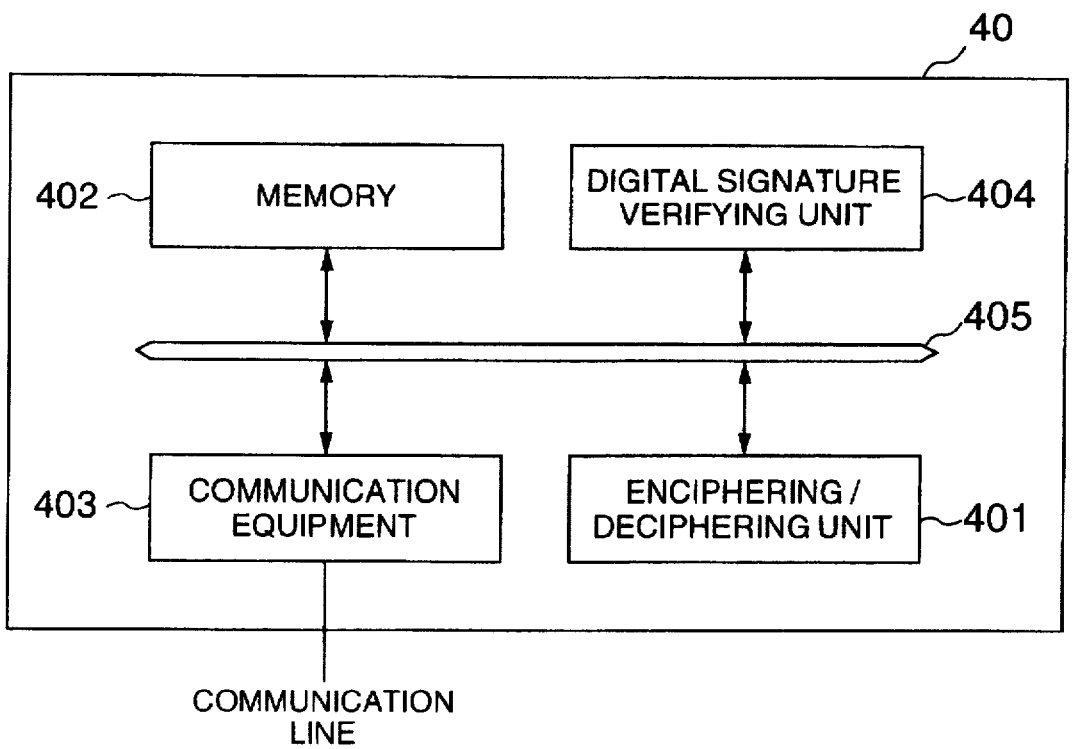
FIG. 10 is a block diagram showing a configuration of a credit card company site apparatus according to the second embodiment.

Further, as shown in FIG. 10, the credit card company site apparatus 40 of the second embodiment includes, in addition to the elements 401 to 403 of the first embodiment shown in FIG. 5, a digital signature verifying unit 404. These elements 401 to 404 are connected to one another through a data bus 405.

Incidentally, in the second embodiment, both the smart card 20 of a user A and the credit card company site apparatus 40 hold previously the same key K(A, C) in common, and also both the retail store site apparatus 30 and the credit card company site apparatus 40 hold previously the same key K(B, C) in common.

Figure 12:
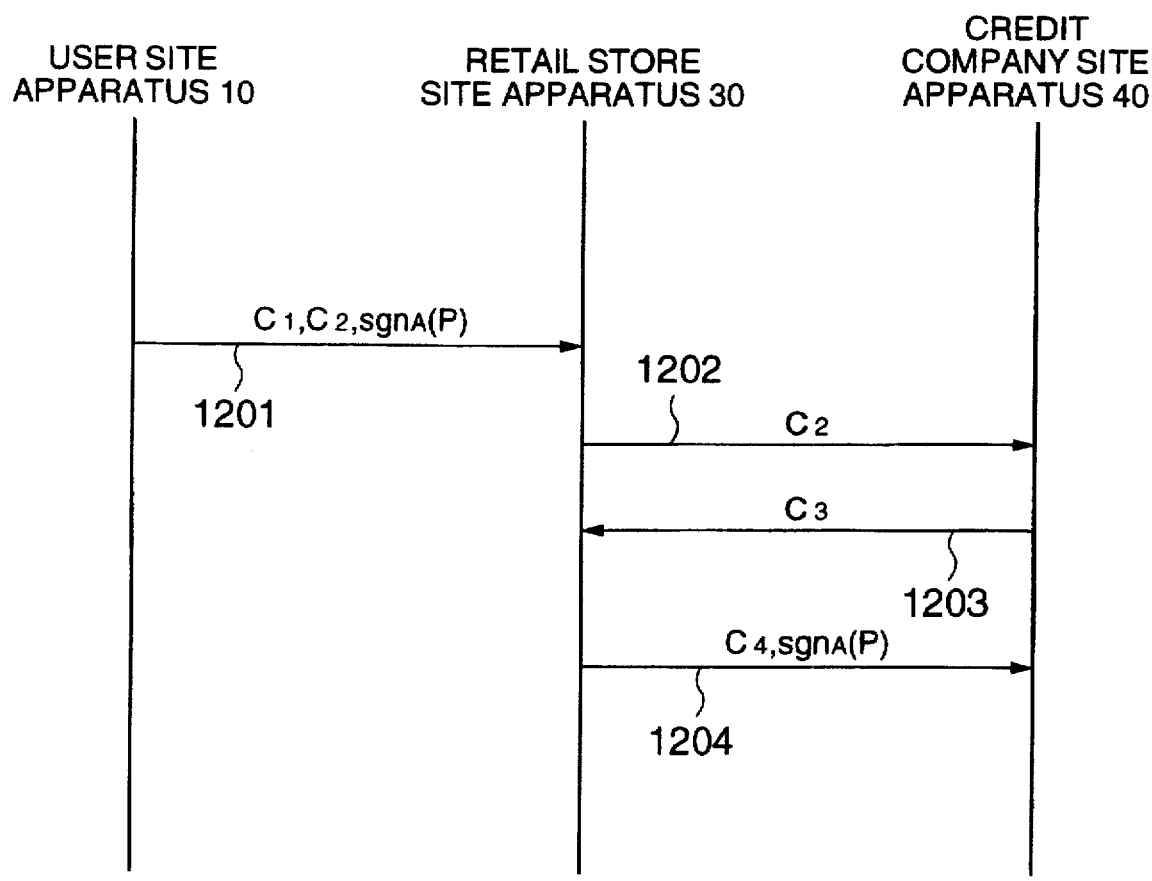
FIG. 12 is a schematic view useful in explaining transmission of information in an electronic shopping system according to the second embodiment.

The description will hereinbelow be given with respect to the operation of the electronic shopping system configured as described above. FIG. 12 is a schematic view useful in explaining transmission of information in the electronic shopping system according to the second embodiment.

1) Firstly, a user A inserts the smart card 20 which the user possesses into a slot (not shown) of the user site apparatus 10. As a result, the enciphering/deciphering unit 201 and the like constituting the smart card 20 are connected to the smart card input/output unit 101. Next, the user selects the desired products by referring to the information relating to the various products (kinds of products, product names, prices of products, or the like) which is, for example, supplied from the retail store site apparatus 30 and is displayed on a display device (not shown) of the user site apparatus 10.

Then, the user operates an input unit (not shown), such as a keyboard, of the user site apparatus 10 so as to activate the document producing unit 102 to produce a predetermined written order P=(P1, P2).

Next, the key producing unit 104 of the user site apparatus 10 produces a key K on the basis of a random number generated by the random number generating unit 103, and then the enciphering/deciphering unit 105 produces a cipher C1, which is defined by the following expression, on the basis of the key K thus produced.

$$C1=E(K: P)$$

In addition, the hash calculator 110 of the user site apparatus 10 calculates a hash function h(P) on the basis of the document P, and then supplies both the key K and the hash function h(P) to the smart card 20 through the smart card input/output unit 101. The hash function h(x) is the public information.

The smart card 20 reads out the key K(A, C) which is previously stored in the memory 202, and the enciphering/deciphering unit 201 produces a cipher C2, which is defined by the following expression, using the key K(A, C) thus read out.

$$C2=E(K(A, C): K)$$

Subsequently, the digital signature producing unit 203 of the smart card 20 calculates a signature sgnA(P) for the hash function h(P) using the secret key associated with the user site apparatus 10. Incidentally, in the present embodiment, the digital signature is obtained on the basis of the so-called RSA.

The signature sgnA(P) thus obtained is supplied to the user site apparatus 10, and the user site apparatus 10 transmits the ciphers C1 and C2, which are obtained in advance as well as the signature sgnA(P) which has been supplied by the smart card 20 to the retail store site apparatus 30 through the communication line 50 (refer to reference numeral 1201 in FIG. 12).

2) After having received both the ciphers C1 and C2 as well as the signature sgnA(P), the communication equipment 303 of the retail store site apparatus 30 transmits only the cipher C2 out of them to the credit card company site apparatus 40 through the communication line 51 (refer to reference numeral 1202 in FIG. 12).

3) The credit card company site apparatus 40 reads out the key K(A, C) which is previously stored in the memory 404, and the enciphering/deciphering unit 401 deciphers the key K using the key K(A, C) thus read out in accordance with the following expression.

$$K=D(K(A, C): C2)$$

In addition, the credit card company site apparatus 40 reads out the key K(B, C) which is previously stored in the memory 404, and then the enciphering/deciphering unit 401 produces a cipher C3, which is defined by the following expression, using the key K(B, C) thus read out.

$$C3=E(K(B, C): K)$$

The cipher C3 thus obtained is then transmitted to the retail store site apparatus 30 through the communication line 51 by the communication equipment 403 (refer to reference numeral 1203 in FIG. 12).

4) After having received the cipher C3, the retail store site apparatus 30 reads out the key K(B, C) which is previously stored in the memory 302, and then the enciphering/deciphering unit 301 deciphers the key K using the key K(B, C) thus read out in accordance with the following expression.

$$K=D(K(B, C): C3)$$

In addition, the enciphering/deciphering unit 301 deciphers the written order P in accordance with the following expression.

$$P=D(K: C1)$$

Next, the digital signature verifying unit 304 of the retail store site apparatus 30 confirms the legality of the digital signature sgnA(P) using the public key associated with the user site apparatus 10, thereby authenticating the written order P given by the user.

In addition, the retail store site apparatus 30 reads out the key K(B, C) which is previously stored in the memory 302, and then the enciphering/deciphering unit 301 calculates a cipher C4, which is defined by the following expression, using the key K(B, C) thus read out.

$$C4=E(K(B, C): P)$$

Both the cipher C4 thus obtained and the digital signature sgnA(P) supplied from the user site apparatus 10 are transmitted to the credit card company site apparatus 40 through the communication line 51 (refer to reference numeral 1204 in FIG. 12).

5) After having received the above-mentioned information, the credit card company site apparatus 40 reads out the key K(B, C) which is previously stored in the memory 404, and then the enciphering/deciphering unit 401 deciphers the document P using the key K(B, C) thus read out on the basis of the cipher C4. In addition, the digital signature verifying unit 404 calculates a hash value h(P) on the basis of the hash function h(x) as the public information, and confirms the legality of the digital signature sgnA(P) using both that hash value and the public key associated with the user site apparatus. As a result, the document P is carried out and hence the order of the products to be purchased given by the user is authenticated.

Next, the description will hereinbelow be given with respect to an electronic shopping system according to a third embodiment of the present invention.

This third embodiment is an example which is suitable for being applied to the case where the credit card company C is considered to be unreliable. In addition, the third embodiment is designed in such a way that the authentication of the user can be carried out without carrying out the key distribution based on the public key concept and also producing the digital signature.

Further, in the present embodiment, since the credit card company authenticates only the information which does not contain the information or the like of the products purchased by the user, it is possible to protect the privacy of the user.

FIGS. 13 to 16 are respectively block diagrams showing configurations of a user site apparatus 10, a smart card 20, a retail store site apparatus 30 and a credit card company site apparatus 40 according to the third embodiment.

Figure 13:
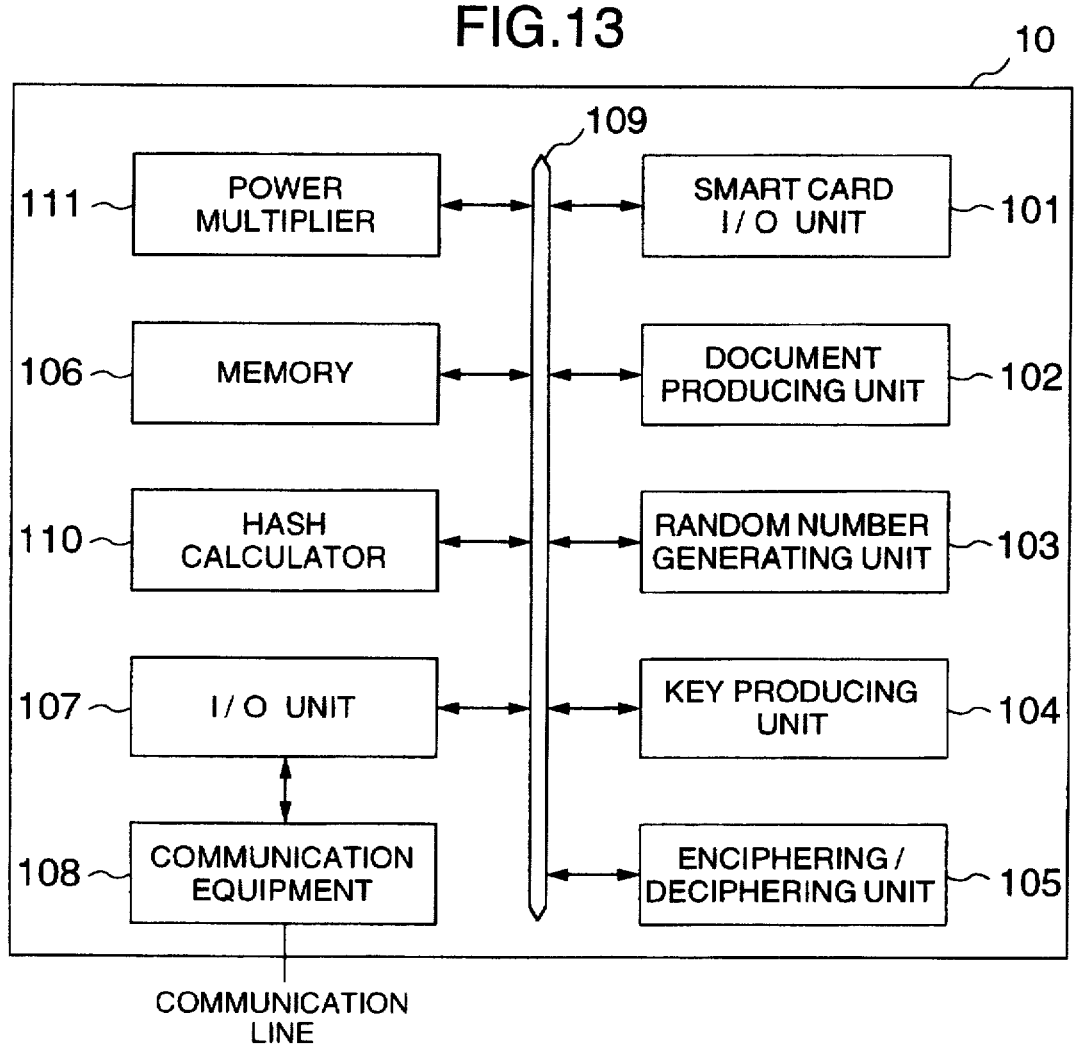
FIG. 13 is a block diagram showing a configuration of a user site apparatus according to a third embodiment of the present invention.
Figure 14:
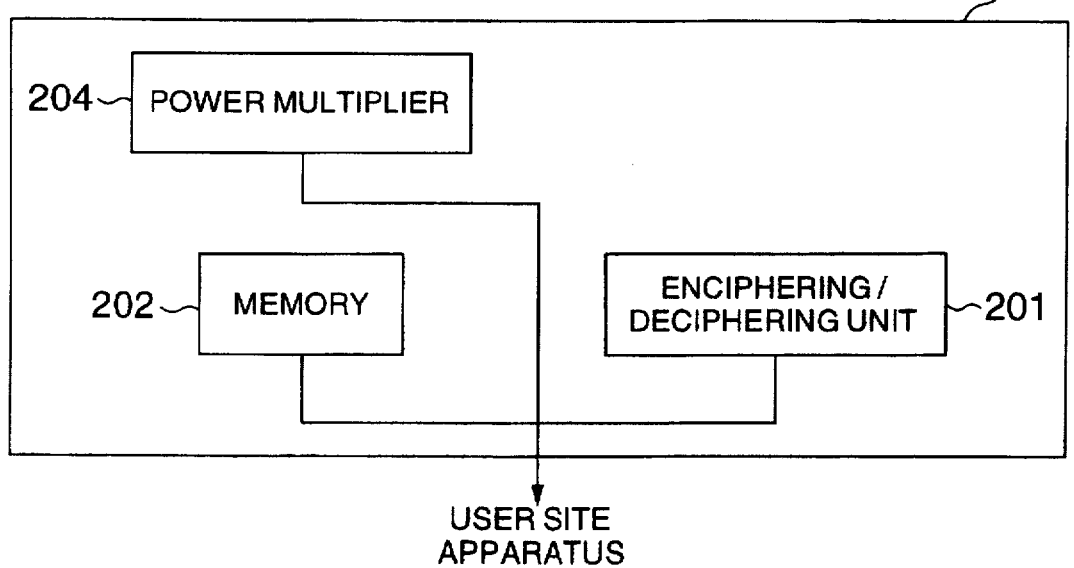
FIG. 14 is a block diagram showing a configuration of a smart card according to the third embodiment.

As shown in FIG. 13, the user site apparatus 10 of the third embodiment includes, in addition to the elements 101 to 108 and 110 of the second embodiment shown in FIG. 7, a power multiplier 111 for carrying out exponential calculation. As shown in FIG. 14, the smart card 20 of the third embodiment includes, in addition to the elements 201 and 202 of the first embodiment shown in FIG. 3, a power multiplier 204 for carrying out exponential calculation.

Figure 15:
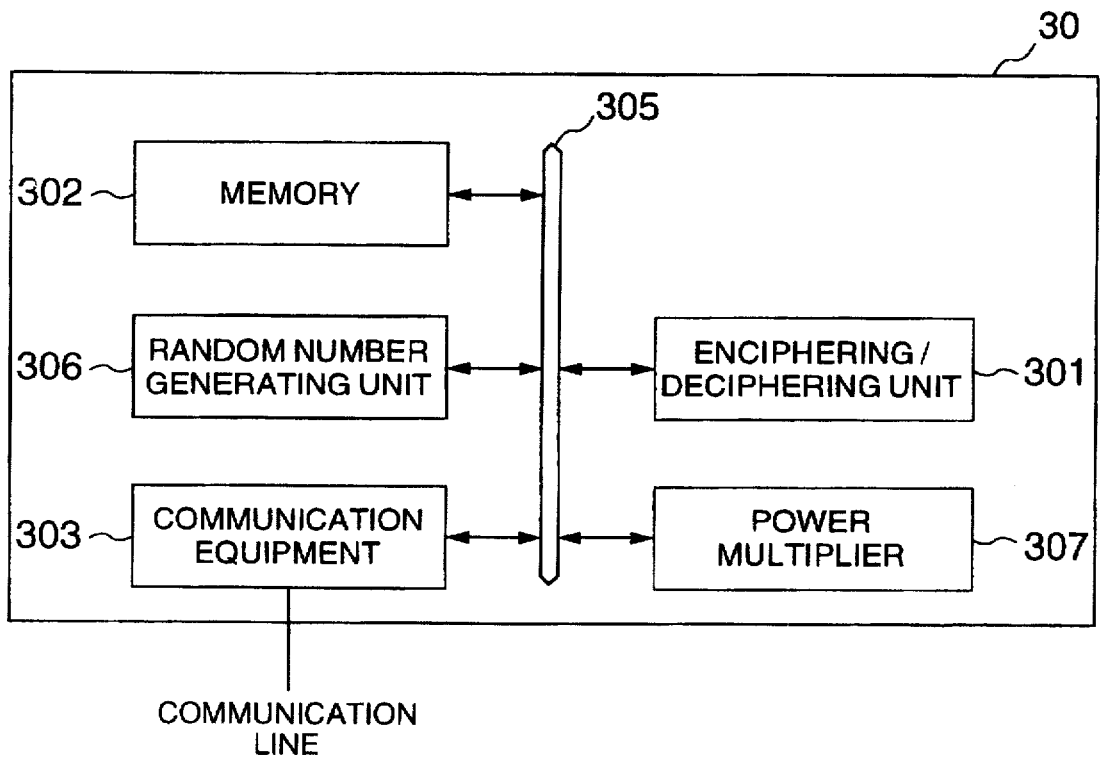
FIG. 15 is a block diagram showing a configuration of a retail store site apparatus according to the third embodiment.

In addition, as shown in FIG. 15, the retail store site apparatus 30 of the third embodiment includes, in addition to the elements 301 to 303 of the first embodiment shown in FIG. 4, a random number generating unit 306 and a power multiplier 307.

Figure 16:
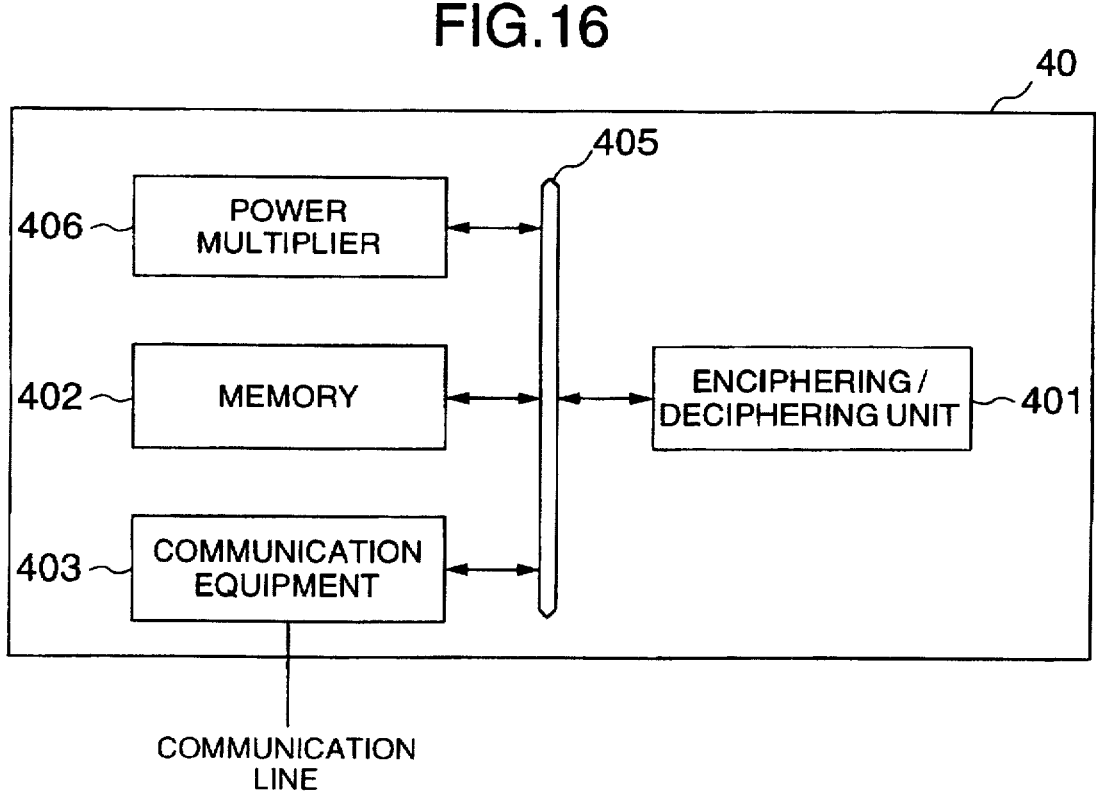
FIG. 16 is a block diagram showing a configuration of a credit card company site apparatus according to the third embodiment.

Further, as shown in FIG. 16, the credit card company site apparatus 40 of the third embodiment includes, in addition to the elements 401 to 403 of the first embodiment shown in FIG. 5, a power multiplier 406. These elements are connected to one another through a data bus 405.

Incidentally, in the third embodiment, both the smart card 20 of a user A and the retail store site apparatus 30 hold previously the same key K(A, B) in common, and also both the retail store site apparatus 30 and the credit card company site apparatus 40 hold previously the same key K(B, C) in common. In addition, a prime number p is open to the public, and the key K(A, B) is set in such a way that a greatest common division (g.c.d) between the key K(B, C) and a numeric number (p−1) is 1, i.e., g.c.d(K(A, B), p−1)=1 is established.

Figure 17:
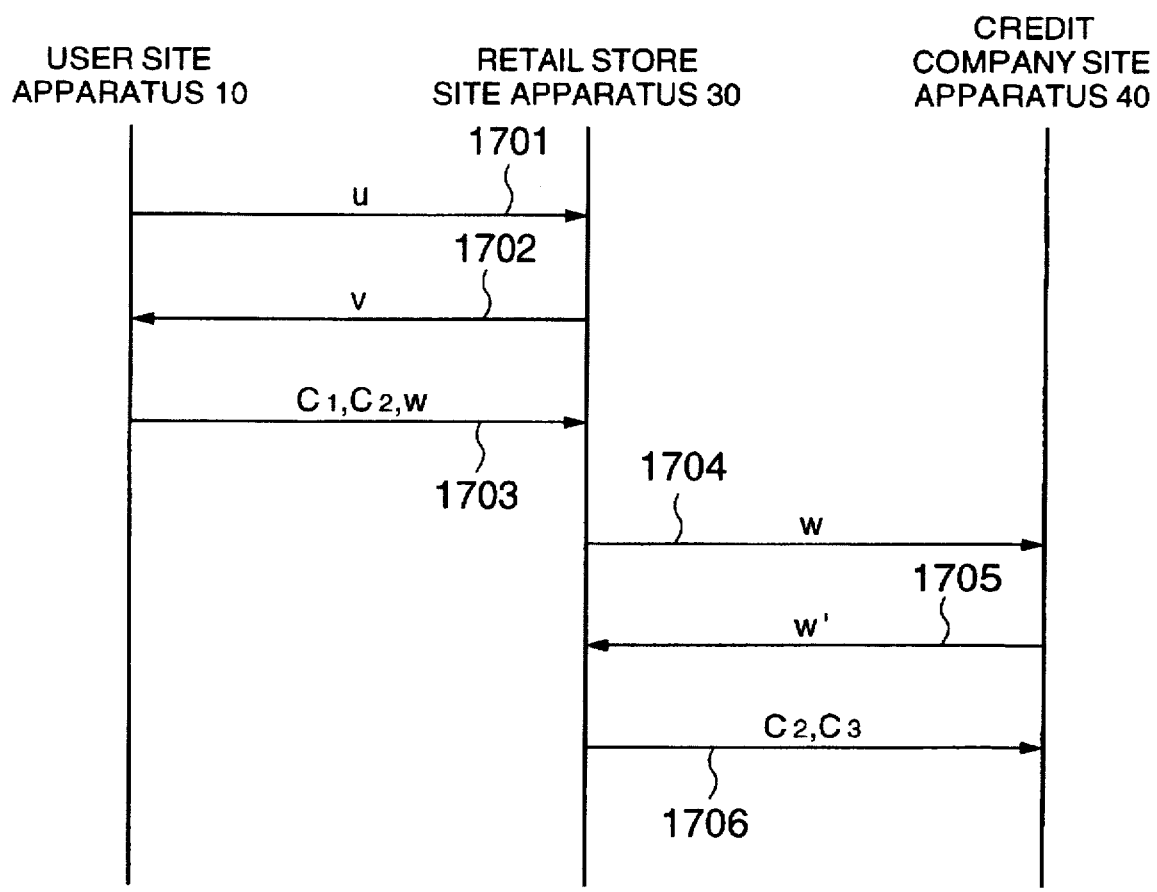
FIG. 17 is a schematic view useful in explaining transmission of information in an electronic shopping system according to the third embodiment.

Next, the description will hereinbelow be given with respect to the operation of the electronic shopping system configured as described above. FIG. 17 is a schematic view useful in explaining transmission of information in the electronic shopping system according to the third embodiment.

1) Firstly, the user A inserts the smart card 20 which the user possesses into a slot (not shown) of the user site apparatus 10. As a result, the enciphering/deciphering unit 201 and the like constituting the smart card 20 are connected to the smart card input/output unit 101. Next, the user selects the desired products by referring to the information of the various products (kinds of products, product names, prices of products, or the like) which is, for example, supplied by the retail store site apparatus 30 and is displayed on a display device (not shown) of the user site apparatus 10.

Then, the user operates an input unit (not shown), such as a keyboard, of the user site apparatus so as to activate the document producing unit 102 to produce a predetermined written order P=(P1, P2). In this connection, predetermined information P1 contained in the document P is a part corresponding to the contents of an order of the products to be purchased given to the retail store, and predetermined information P2 contained therein is a part corresponding to information, including a credit card number and a sum of purchased products, to be sent to the credit card company C.

Next, the key producing unit 104 of the user site apparatus 10 produces a key K (0<K<p) on the basis of a random number generated by the random number generating unit 103, and the enciphering/deciphering unit 105 produces a cipher C1, which is defined by the following expression, on the basis of the key K thus produced.

$$C1 = E(K: P)$$

Next, the random number generating unit 103 of the user site apparatus 10 produces a random number r∈Z which fulfills the conditions of 0<r<p−1 and g.c.d.(r, P−1)=1, and then supplies the random number r to the power multiplier 111. In this connection, Z represents a domain of integers.

The power multiplier 111 produces a value u, which is defined by the following expression, on the basis of the random number r supplied thereto.

$$u = \exp(K: r) \bmod p$$

where exp(a: x) represents a to the x-th power.

The communication equipment 108 of the user site apparatus 10 transmits the resultant value u to the retail store site apparatus 30 through the communication line 50 (refer to reference numeral 1701 in FIG. 17).

2) Next, the random number generating unit 305 of the retail store site apparatus 30 produces a random number t∈Z which fulfills the conditions of 0<t<p−1 and g.c.d(t, P−1)=1, and then supplies the random number thus produces to the power multiplier 307. Then, the power multiplier 307 calculates a value v, which is defined by the following expression, on the basis of the random number t supplied thereto.

$$v = \exp(u: t) \bmod p$$

The value v thus obtained is transmitted to the user site apparatus 10 through the communication line 50 by the communication equipment 303 (refer to reference numeral 1702 in FIG. 17).

3) After having received the value v, the user site apparatus 10 supplies both the random number r, which is temporarily stored in the memory 106, and the value u thus received to the smart card 20 through the smart card input/output unit 101. The smart card 20 reads out the key K(A, B) stored in the memory 203, and the power multiplier 204 calculates a value w, which is defined by the following expression, using the key K(A, B) thus read out.

$$w = \exp(v: K(A, B)/r) \bmod p$$

In addition, the smart card 20 reads out the key K(A, C) stored in the memory 203, and then the enciphering/deciphering unit 202 produces a cipher C2, which is defined by the following expression, using the key K(A, C) thus read out.

$$C2 = E(K(A, C): P2)$$

Both the value w and the cipher C2 thus obtained are supplied to the user site apparatus 10. Next, the cipher C1 which is obtained in advance as well as the cipher C2 and the value w are transmitted to the retail store site apparatus 30 through the communication line 50 by the communication equipment 108 of the user site apparatus 10 (refer to reference numeral 1703 in FIG. 17).

4) After having received the ciphers C1 and C2, and the value w, the communication equipment 303 of the retail store site apparatus 30 transmits only the value w out of them to the credit card company site apparatus 40 through the communication line 51 (refer to reference numeral 1704 in FIG. 17).

5) After having received the value w transmitted from the retail store site apparatus 30, the credit card company site apparatus 40 reads out the key K(A, C) stored in the memory 404, and then the power multiplier 402 produces a value w', which is defined by the following expression, using the key K(A, C) thus read out.

$$w' = \exp(w: 1/K(A, C)) \bmod p$$

The value w' thus obtained is transmitted to the retail store site apparatus 30 through the communication line 51 by the communication equipment 403 (refer to reference numeral 1705 in FIG. 17).

6) After having received the value w' transmitted from the credit card company site apparatus 40, the retail store site apparatus 30 reads out a random number t which is temporarily stored in the memory 302, and the power multiplier 307 deciphers the key K using the random number t on the basis of the following expression.

$$K = \exp(w': 1/t) \mod p$$

In addition, the enciphering/deciphering unit 310 deciphers the document P using the resultant key K on the basis of the following expression.

$$P = D(K: C1)$$

Subsequently, the enciphering/deciphering unit 301 of the retail store site apparatus 30 enciphers the part P2 contained in the document P using the key K(B, C) in accordance with the following expression.

$$C3 = E(K(B, C): P2)$$

Both the cipher C3 thus obtained and the cipher C2 which is transmitted in advance from the user site apparatus 10 are transmitted to the credit card company site apparatus 40 through the communication line 51 by the communication equipment 303 (refer to reference numeral 1706 in FIG. 17).

7) After having received both the ciphers C2 and C3, the credit card company site apparatus 40 reads out both the keys K(A, C) and K(B, C) stored in the memory 404, and then the enciphering/deciphering unit 401 deciphers the part P2 in the written order P using the keys K(A, C) and K(B, C) thus read out, respectively. After the two parts P2 have been obtained using the two keys in such a way, respectively, it is judged whether or not the two parts P2 match each other, thereby authenticating the part P2. In the case where the two parts P2 match each other, it is judged that the order of the products to be purchased is given by the legal user.

As described above, according to the present embodiment, the legality of the order of the products to be purchased which is given by the user can be authenticated, and also, out of the information relating to the written order which is given by the user, only the information which the credit card company should become aware of can be transmitted to the credit card company.

Next, the description will hereinbelow be given with respect to an electronic shopping system according to a fourth embodiment of the present invention.

The fourth embodiment is an example which is suitable for being applied to the case where the credit card company C is considered to be unreliable. In addition, the fourth embodiment is designed in such a way that the authentication of the user is carried out by producing the digital signature on the basis of the procedure shown in FIG. 1 without carrying out the key distribution based on the public key concept.

Figure 18:
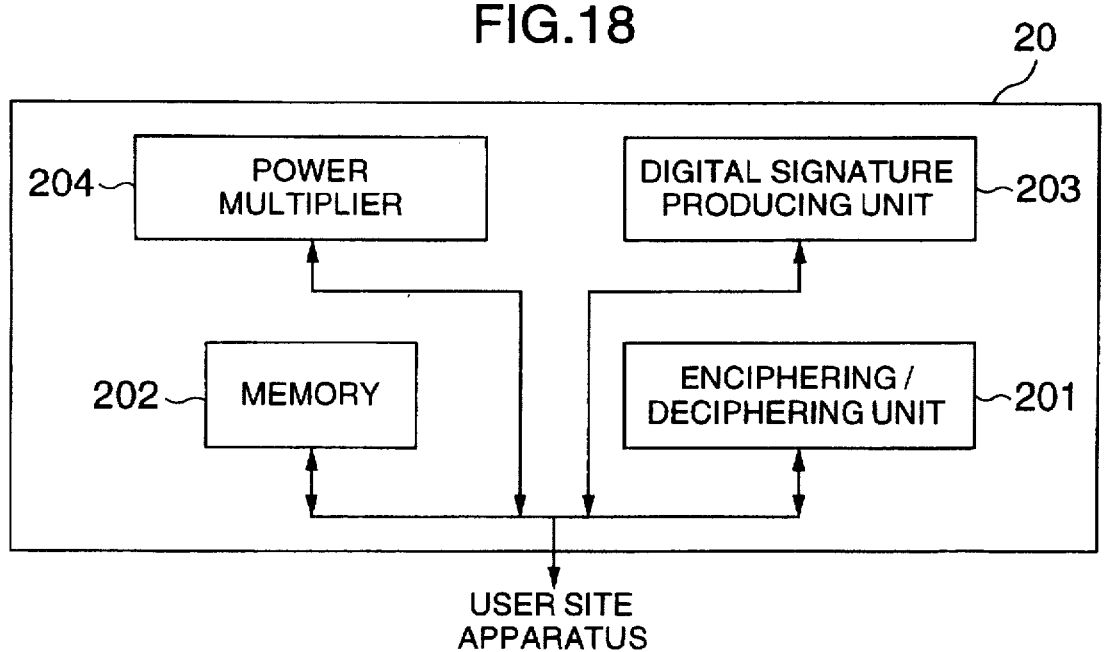
FIG. 18 is a block diagram showing a configuration of a smart card according to a fourth embodiment.
Figure 19:
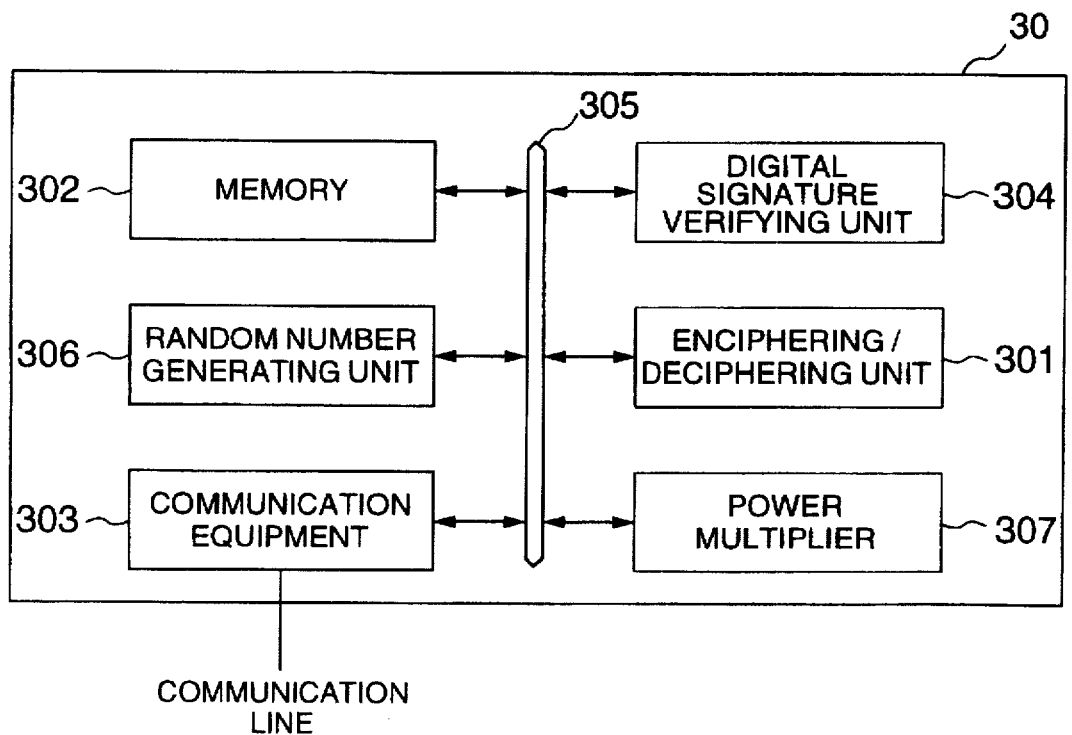
FIG. 19 is a block diagram showing a configuration of a retail store site apparatus according to the fourth embodiment.
Figure 20:
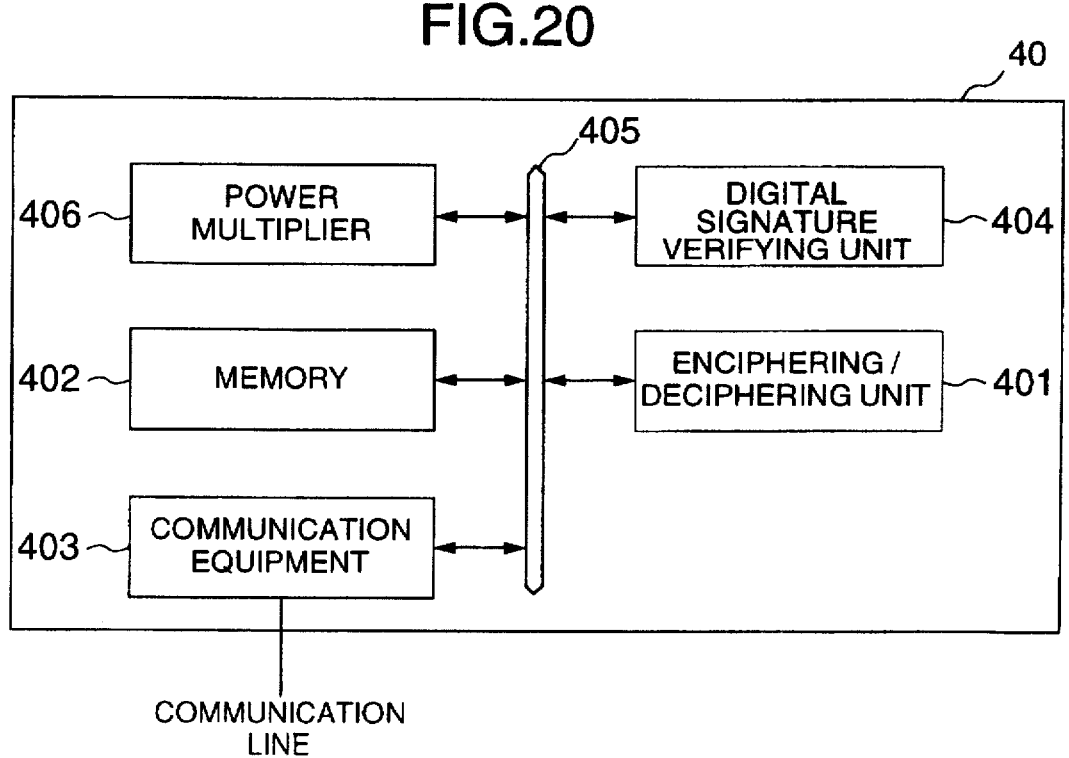
FIG. 20 is a block diagram showing a configuration of a credit card company site apparatus according to the fourth embodiment.

FIGS. 18 to 20 are respectively block diagrams showing configurations of a smart card 20, a retail store site apparatus 30 and a credit card company site apparatus 40 according to the fourth embodiment of the lo present invention. Incidentally, the user site apparatus 10 of the fourth embodiment has the same configuration as that of the user site apparatus of the third embodiment shown in FIG. 13.

As shown in FIG. 18, the smart card 20 of the fourth embodiment includes, in addition to the elements 201 and 202 of the first embodiment shown in FIG. 3, a digital signature verifying unit 404 and a power multiplier 204.

In addition, as shown in FIG. 19, the retail store site apparatus 30 of the fourth embodiment includes, in addition to the elements 301 to 303 of the first embodiment shown in FIG. 4, a digital signature verifying unit 304, a random number generating unit 306 and a power multiplier 307.

Further, as shown in FIG. 20, the credit card company site apparatus 40 of the fourth embodiment includes, in addition to the elements 401 to 403 of the first embodiment shown in FIG. 5, a digital signature verifying unit 404 and a power multiplier 406. These elements are connected to one another through a data bus 405.

Incidentally, in the fourth embodiment, both the smart card 20 of the user and the retail store site apparatus 30 hold previously the same key K(A, C) in common, and also both the retail store site apparatus 30 and the credit card company site apparatus 40 hold previously the same key K(B, C) in common. In addition, a prime number p is open to the public, and also the key K(A, C) is set so as to fulfill the condition of g.c.d(K(A, C), p−1)=1.

Figure 21:
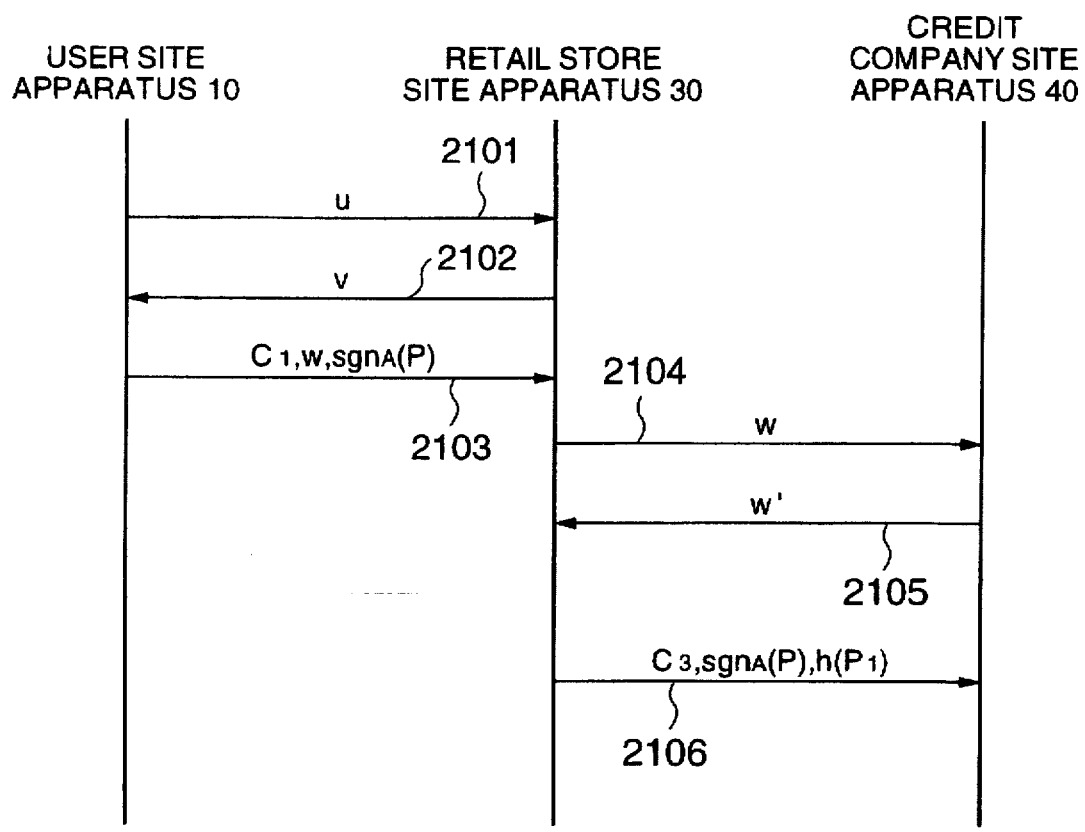
FIG. 21 is a schematic view useful in explaining transmission of information in an electronic shopping system according to the fourth embodiment.

Next, the description will hereinbelow be given with respect to the operation of the electronic shopping system configured as described above. FIG. 21 is a schematic view useful in explaining transmission of information of the electronic shopping system according to the fourth embodiment of the present invention.

1) Firstly, a user A inserts the smart card 20 which the user possesses into a slot (not shown) of the user site apparatus 10. As a result, the enciphering/deciphering unit 201 and the like constituting the smart card 20 are connected to the smart card input/output unit 101. Next, the user selects the desired products by referring to the information of the various products (kinds of products, product names, prices of products, or the like) which is, for example, supplied by the retail store site apparatus 30 and is displayed on a display device (not shown) of the user site apparatus 10.

Then, the user operates an input unit (not shown), such as a keyboard, of the user site apparatus 10 so as to activate the document producing unit 102 to produce a predetermined written order P=(P1, P2). In this connection, predetermined information P1 contained in the document P is a part corresponding to the contents of an order of the products to be purchased given to the retail store, and predetermined information P2 contained therein is a part corresponding to the information, including the credit card number and a sum of purchased products, to be sent to the credit card company C.

Next, the key producing unit 104 of the user site apparatus 10 produces a key K (0<K<p) on the basis of the random number generated by the random number generating unit 103, and then the enciphering/deciphering unit 105 produces a cipher C, which is defined by the following expression, on the basis of the key K thus produced.

$$C1 = E(K: P)$$

Next, the random number generating unit 103 of the user site apparatus 10 generates a random number r∈Z which fulfills the conditions of 0<r<p−1 and g.c.d(r, p−1)=1, and supplies the random number r thus generated to the power multiplier 111. In this connection, Z represents a domain of integers. Then, the power multiplier 111 produces a value u, which is defined by the following expression, on the basis of the random number r supplied thereto.

$$u = \exp(K: r) \mod p$$

The communication equipment 108 of the user site apparatus 10 transmits the resultant value u to the retail store site apparatus 30 through the communication line 50 (refer to reference numeral 2101 in FIG. 21).

2) Next, the random number generating unit 305 of the retail store site apparatus 30 generates a random number t∈Z which fulfills the conditions of $0 < t \leq p-1$ and $g.c.d(t, p-1) = 1$, and supplies the random number t thus generated to the power multiplier 307. Then, the power multiplier 307 produces a value v, which is defined by the following expression, on the basis of the random number t supplied thereto.

$$v = \exp(u: t) \bmod p$$

The value v thus obtained is transmitted to the user site apparatus 10 through the communication line 50 by the communication equipment 303 (refer to reference numeral 2102 in FIG. 21).

Figure 11:
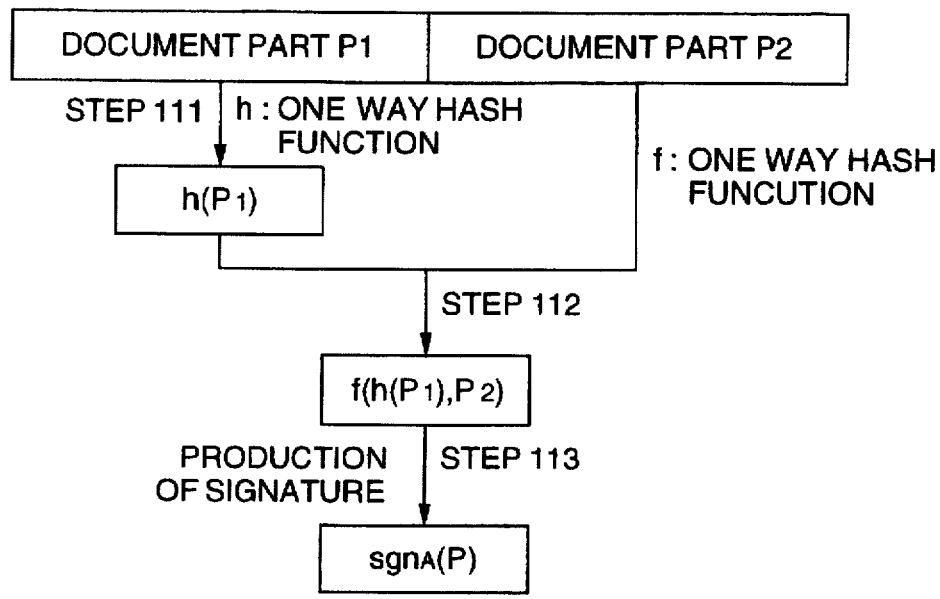
FIG. 11 is a schematic view showing a procedure of producing a digital signature on the basis of a document.

3) The hash calculator 110 of the user site apparatus 10 calculates a hash value f(h(P1), P2) on the basis of the document P in accordance with the processing procedure shown in FIG. 11, and supplies both the key K and the hash value f(h(P1), P2) to the smart card 20 through the smart card input/output unit 101.

After the smart card 20 has received the above-mentioned information, the power multiplier 204 calculates a value w which is defined by the following expression.

$$w = \exp(v: K(A, C)/r) \bmod p$$

Now, FIG. 11 is a schematic view showing the procedure of producing a digital signature according to the present embodiment. As shown in FIG. 11, in the present embodiment, the procedure of producing a digital signature includes the steps of: calculating a hash value h(P1) of the part P1 contained in the document P (Step 111); calculating a second hash value f(h(P1), P2) for the hash value h(P1) and the part P2 of the document P (Step 112); and calculating a digital signature sgnA(P) for the second hash value f(h(P1), P2) using the secret key (Step 113). In accordance with this procedure, the digital signature producing unit 201 calculates the digital signature sgnA(P) for the second hash value f(h(P1), P2) using the secret key associated with the user site apparatus. Incidentally, similarly to the second embodiment, in the present embodiment as well, the digital signature is calculated on the basis of RSA.

The digital signature sgnA(P) thus obtained is supplied to the user site apparatus 10, and then the user site apparatus 10 transmits the cipher C1 and the value w which are obtained in advance and the digital signature sgnA(P) which has been supplied from the smart card 20 to the retail store site apparatus 30 through the communication line 50 (refer to reference numeral 2103 in FIG. 21).

4) After having received both the cipher C1 and the value w as well as the digital signature sgnA(P), the communication equipment 303 of the retail store site apparatus 30 transmits only the value w out of them to the credit card company site apparatus 40 through the communication line 51 (refer to reference numeral 2104 in FIG. 21).

5) After having received the value w transmitted from the retail store site apparatus 30, the credit card company site apparatus 40 reads out the key K(A, C) stored in the memory 404, and then the power multiplier 402 produces a value w', which is defined by the following expression, using the key K(A, C) thus read out.

$$w' = \exp(w: 1/K(A, C)) \bmod p$$

The value w' thus obtained is then transmitted to the retail store site apparatus 30 through the communication line 51 by the communication equipment 403 (refer to reference numeral 2105 in FIG. 21).

6) After having received the value w' transmitted from the credit card company site apparatus 40, the retail store site apparatus 30 reads out a random number t which is temporarily stored in the memory 302, and the power multiplier 307 deciphers the key K using the random number t on the basis of the following expression.

$$K = \exp(w': 1/t) \bmod p$$

In addition, the enciphering/deciphering unit 301 deciphers the document P using the resultant key K on the basis of the following expression.

$$P = D(K: C1)$$

Next, the enciphering/deciphering unit 301 of the retail store site apparatus 30 enciphers the part P2 contained in the written order P using the key K(B, C) on the basis of the following expression.

$$C3 = E(K(B, C): P2)$$

Next, the digital signature verifying unit 304 of the retail store site apparatus 30 confirms the legality of the digital signature sgnA(P) using the public key associated with the user site apparatus 10, thereby authenticating the written order P given by the user. In addition, the retail store site apparatus 30 calculates a hash value h(P1) using the hash function as the public information.

The cipher C3 thus obtained as well as the digital signature sgnA(P) and the hash value h(P1) which are supplied in advance from the user site apparatus 10 are transmitted to the credit card company site apparatus 40 through the communication line 51 by the communication equipment 303 (refer to reference numeral 2106 in FIG. 21).

7) The credit card company site apparatus 40 reads out the key K(B, C) stored in the memory 404, the enciphering/deciphering unit 401 deciphers the part P2 in the document P using key K(B, C) thus read out, and the digital signature verifying unit 404 confirms the legality of the digital signature sgnA(P) using the part P2 in the document P, the hash value h(P1) and the public key associated with the user site apparatus 10. As a result, the authentication of the apart P2 of the document P is carried out, and hence the order of the products to be purchased which has been given by the user is authenticated.

Next, the description will hereinbelow be given with respect to an electronic shopping system according to a fifth embodiment of the present invention.

In the fifth embodiment, the configurations of the user site apparatus 10, the smart card 20, the retail store site apparatus 30 and the credit card company site apparatus 40 are the same as those in the fourth embodiment. In addition, according to the fifth embodiment, there is provided a secure electronic shopping system in which the number of communication between the retail store site apparatus 30 and the credit card company site apparatus 40 is further reduced as compared with the fourth embodiment.

Incidentally, in the fifth embodiment, both the retail store site apparatus 30 and the credit card company site apparatus 40 hold previously the same key K(B, C) in common. In addition, a prime number p is open to the public.

Figure 22:
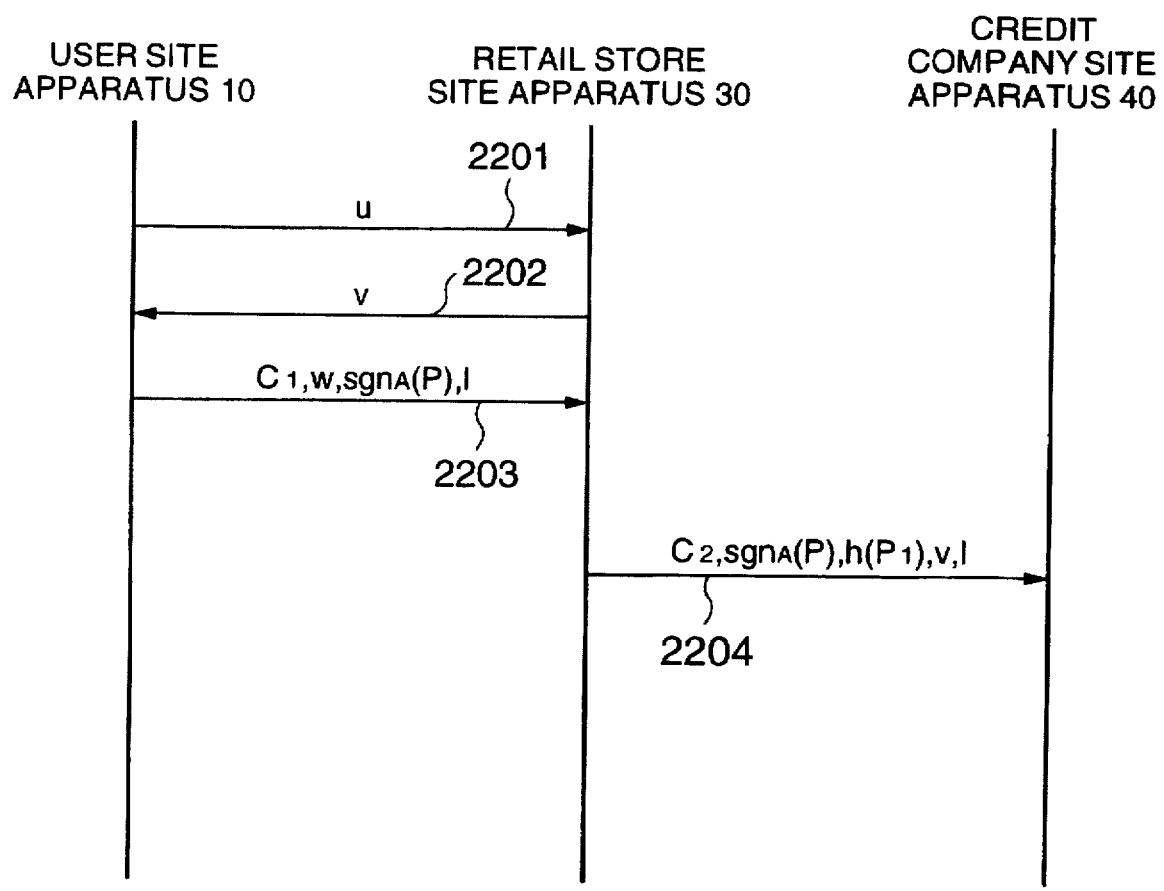
FIG. 22 is a schematic view useful in explaining transmission of information of an electronic shopping system according to a fifth embodiment of the present invention.

The description will hereinbelow be given with respect to the operation of the electronic shopping system configured as described above. Now, FIG. 22 is a schematic view useful in explaining transmission of information in the electronic shopping system according to the fifth embodiment.

1) Firstly, a user A inserts the smart card 20 which the user possesses into a slot (not shown) of the user site apparatus 10. As a result, the enciphering/deciphering unit 201 and the like constituting the smart card 20 are connected to the smart card input/output unit 101. Next, the user selects the desired products by referring to the information of the various products (kinds of products, product names, prices of products, or the like) which is, for example, supplied from the retail store site apparatus 30 and is displayed on a display device (not shown) of the user site apparatus 10.

Then, the user operates an input unit (not shown), such as a keyboard, of the user site apparatus 10 so as to activate the document producing unit 102 to produce a predetermined written order P=(P1, P2).

Next, the key producing unit 104 of the user site apparatus 10 produces a key K (0<K<p) on the basis of a random number generated by the random number generating unit 103, and then deciphering/enciphering unit 105 produces a cipher C1, which is defined by the following expression, on the basis of the key K thus produced.

$$C1 = E(K; P)$$

Next, the random number generating unit 103 of the user site apparatus 10 generates a random number r∈Z which fulfills the conditions of 0<r<p−1 and g.c.d(r, p−1)=1, and then supplies the random number r thus generated to the power multiplier 111. In this connection, Z represents a domain of integers. The power multiplier 111 produces a value u, which is defined by the following expression, on the basis of the random number r supplied thereto.

$$u = \exp(K; r) \bmod p$$

The communication equipment 108 of the user site apparatus 10 transmits the resultant value u to the retail store site apparatus 30 through the communication line 50 (refer to reference numeral 2201 in FIG. 22).

2) Next, the random number generating unit 305 of the retail store site apparatus 30 generates a random number t∈Z which fulfills the conditions of 0<t<p−1 and g.c.d(t, p−1)=1, and then supplies the random number t thus generates to the power multiplier 307. Then, the power multiplier 307 calculates a value v, which is defined by the following expression, on the basis of the random number t supplied thereto.

$$v = \exp(u; t) \bmod p$$

The value v thus obtained is then transmitted to the user site apparatus 10 through the communication line 50 by the communication equipment 303 (refer to reference numeral 2202 in FIG. 22).

3) Next, the power multiplier 111 of the user site apparatus 10 calculates a value w defined by the following expression.

$$w = \exp(v; 1/r) \bmod p$$

In addition, the hash calculator 110 of the user site apparatus 10 calculates a hash value g(f(h(P1), P2, v, I). In this connection, each of f(x, y), g(x, y, z) and h(x) represents a hash function, and all these hash functions are the public information. I is identification information representing a transmitting/receiving person. While in the present embodiment, the identification information is determined on the basis of a full name and a name of the user as a transmitting person, the present invention is not limited thereto. That is, in order to further ensure the stability of transmission/reception of the information, the time information may be further added thereto.

The hash value g(f(h(P1), P2, v, I) thus obtained is supplied to the smart card 20 by the smart card input/output unit 101.

After the smart card 20 has received the above-mentioned information, the digital signature producing unit 201 calculates a digital signature sgnA(P) for the hash value g(f(h(P1), P2), v, I) using the secret key associated with the user site apparatus. The digital signature sgnA(P) thus obtained is supplied to the user site apparatus 10, and then the user site apparatus 10 transmits the cipher C1 and the value w which are obtained in advance as well as the digital signature sgnA(P) which has been supplied from the smart card 20 to the retail store site apparatus 30 through the communication line 50 (refer to reference numeral 2203 in FIG. 22).

4) The retail store site apparatus 30 reads out a random number t which is temporarily stored in the memory 302, and the power multiplier 307 deciphers the key K using the random number t thus read out on the basis of the following expression.

$$Kexp(w; 1/t) \bmod p$$

In addition, the enciphering/deciphering unit 301 deciphers the document P using the resultant key K on the basis of the following expression.

$$P = D(K, C1)$$

Next, the digital signature verifying unit 304 of the retail store site apparatus 30 confirms the legality of the digital signature sgnA(P), thereby authenticating the written order P given by the user.

In addition, the enciphering/deciphering unit 301 of the retail store apparatus 30 enciphers the part P2 contained in the written order P using the key K(B, C) in accordance with the following expression.

$$C3 = E(K(B, C); P2)$$

The cipher C3 thus obtained, the digital signature sgnA (P), the value v and the identification information I which have been supplied from the user site apparatus 10, and the hash value h(P1) which has been obtained on the basis of the hash function h(x) as the public information by the retail store site apparatus are transmitted to the credit card company site apparatus 40 through the communication line 51 by the communication equipment 303 (refer to reference numeral 2204 in FIG. 22).

5) The credit card company site apparatus 40 reads out the key K(B, C) stored in the memory 404, and then the enciphering/deciphering unit 401 deciphers the part P2 of the document P using the K(B, C) thus read out on the basis of the cipher C3. In addition, the digital signature verifying unit 404 confirms the legality of the digital signature sgnA (P) using the resultant the part P2 of document P, the value v, the identification information I, the hash value h(P1) and the public key associated with the user site apparatus 10. As a result, the authentication of the part P2 of the document P is carried out, and hence the order of the products given by the user is authenticated.

Next, the description will hereinbelow be given with respect to an electronic shopping system according to a sixth embodiment of the present invention.

In the sixth embodiment, the key distribution based on the public key cryptosystem is carried out. In addition, according to the sixth embodiment, there is provided a secure electronic shopping system, provided with a facility of protecting the privacy of the user, which is designed in such a way that the digital signature is produced in accordance with the procedure shown in FIG. 11, and the user is authenticated on the basis of the digital signature.

In the sixth embodiment, the configurations of the user site apparatus 10, the smart card 20, the retail store site apparatus 30 and the credit card company site apparatus 40 are the same as those in the second embodiment shown in FIGS. 7 to 10, respectively.

In addition, both the retail store site apparatus 30 and the credit card company site apparatus 40 hold the same key K(B, C) in common.

Figure 23:
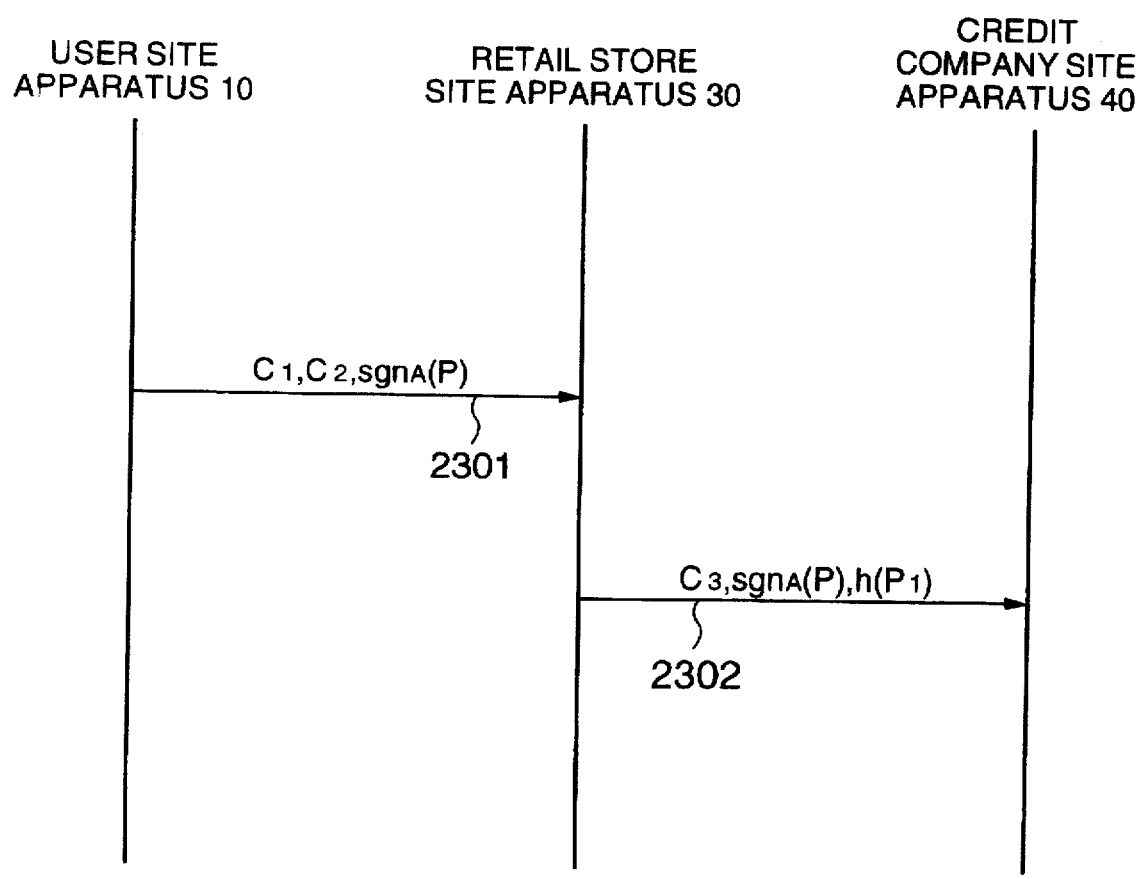
FIG. 23 is a schematic view useful in explaining transmission of information of an electronic shopping system according to a sixth embodiment of the present invention.

Next, the description will hereinbelow be given with respect to the operation of the electronic shopping system according to the sixth embodiment configured as described above. FIG. 23 is a schematic view useful in explaining transmission of information in the electronic shopping system according to the sixth embodiment.

1) Firstly, a user A inserts the smart card 20 which the user possesses into a slot (not shown) of the user site apparatus 10. As a result, the enciphering/deciphering unit 201 and the like constituting the smart card 20 are connected to the smart card input/output unit 101. Next, the user selects the desired products by referring to the information of the various products (kinds of products, product names, prices of products, or the like) which is, for example, supplied from the retail store site apparatus 30 and is displayed on a display device (not shown) of the user site apparatus 10.

Then, the user operates an input unit (not shown), such as a keyboard, of the user site apparatus 10 so as to activate the document producing unit 102 to produce a predetermined written order P=(P1, P2).

Next, the key producing unit 104 of the user site apparatus 10 produces a key K on the basis of a random number generated by the random number generating unit 103, and then the enciphering/deciphering unit 105 produces a cipher C1, which is defined by the following expression, on the basis of the key K thus produced.

$$C1=E(K; P)$$

In addition, the enciphering/deciphering unit 105 produces a cipher C2, which is enciphered on the basis of the public key cipher method, using a public key PK(B) associated with the retail store site apparatus 30.

Next, the hash calculator 110 of the user site apparatus 10 calculates a hash value f(h(P1), P2) on the basis of a document P, and supplies the hash value f(h(P1), P2) thus calculated to the smart card 20 through the smart card input/output unit 101. In this connection, similarly to the above-mentioned embodiments, the hash functions f(x, y) and h(x) are the public information.

The digital signature producing unit 203 of the smart card 20 calculates a digital signature sgnA(P) for the hash value f(h(P1), P2) using a secret key associated with the user site apparatus 10 in accordance with the procedure shown in FIG. 11.

The digital signature sgnA(P) thus obtained is supplied to the user site apparatus 10. Then, the user site apparatus 10 transmits the ciphers C1 and C2 which are obtained in advance as well as the digital signature sgnA(P) which has been supplied from the smart card 20 to the retail store site apparatus 30 through the communication line 50 (refer to reference numeral 2301 in FIG. 23).

2) After having received the ciphers C1 and C2 as well as the digital signature sgnA(P), the retail store site apparatus 30 reads out a secret key SK(B) which is associated with the retail store site apparatus 30 and which is previously stored in the memory 302, and the enciphering/deciphering unit 301 deciphering the key K using the secret key SK(B) thus read out on the basis of the cipher C2. In addition, the enciphering/deciphering unit 301 deciphers a written order P in accordance with the following expression.

$$P=D(K; C1)$$

Next, the digital signature verifying unit 304 of the retail store site apparatus 30 confirms the legality of the digital signature sgnA(P) using the public key associated with the user site apparatus 10, thereby authenticating the written order P given by the user.

In addition, the retail store site apparatus 30 reads out a key K(B, C) stored in the memory 302, the enciphering/deciphering unit 301 calculates a cipher C3 using the key K(B, C) thus read out, and the communication equipment 303 transmits the resultant cipher C3, the digital signature sgnA(P) which has been supplied from the user site apparatus 10, and a hash value h(P) which has been calculated on the basis of the hash function h(x) as the public information to the credit card company site apparatus 40.

3) After having received the above-mentioned information, the credit card company site apparatus 40 reads out the key K(B, C) stored in the memory 404, and then the enciphering/deciphering unit 401 deciphers the part P2 of the document P using the key K(B, C) thus read out on the basis of the cipher C3. In addition, the digital signature verifying unit 404 confirms the legality of the digital signature sgnA(P) using the public key associated with the user site apparatus. As a result, the authentication of the part P2 of the document P is carried out, and hence the order for the products to be purchased which has been given by the user is authenticated.

It is to be understood that the present invention is not limited to the above-mentioned embodiments, and hence various changes and modifications may be made by those skilled in the art without departing from the spirit and scope of the present invention.

For example, while each of the above-mentioned embodiments is designed in such a way that the user possesses the smart card 20 in order for the smart card 20 to be connected to the user site apparatus 10, the present invention is not limited thereto. That is, in the case where the user site apparatus is supposed to be used by only one user, the smart card may be integrated into the user site apparatus.

In addition, in the present specification, by means is not simply meant the physical means, but is also meant the software means in which the function of the means is realized by the software. Further, the function of one means may be realized by two or more physical means, or the functions of two or more means may be realized by one physical means.

As set forth hereinabove, according to the present invention, it is possible to provide an electronic shopping method and an electronic shopping system which are capable of authenticating the legality of a user and the legality of a sum of products purchased by the user on the basis of the information transmitted from a retail store.

In addition, according to the present invention, it is possible to provide an electronic shopping method and an electronic shopping system which are designed in such a way that only a retail store can become aware of the information relating to the products purchased by a user, and a credit card company can not become aware of only the information, including the information relating to a sum of products purchased by the user, which is required for clearing up a sum of products purchased by the user.

We claim:

1. An electronic shopping method in which by using a communication network to which a first apparatus for being operated by a user, a second apparatus associated with a retail store for providing information with respect to products to be purchased by the user, and a third apparatus associated with a credit card company for paying the prices for the products purchased by the user are connected, the user operates said first apparatus so as to transmit a written order that the user purchases the desired products to said second apparatus, and said second apparatus transmits at least predetermined information of the written order of interest to said third apparatus, said method comprises that:

both said first apparatus and said third apparatus hold a first key in common, and both said second apparatus and said third apparatus hold a second key in common;

said first apparatus calculates a first cipher text which is obtained by enciphering the written order exhibiting the products to be purchased using a third key selected at random, a second cipher text which is obtained by enciphering the third key using the first key, and authentication information relating to at least a predetermined part of the written order, and then transmits the first cipher text, the second cipher text and the authentication information to said second apparatus through said communication network;

said second apparatus transmits the second cipher text to said third apparatus;

said third apparatus deciphers the third key using the first key on the basis of the second cipher text, and calculates a third cipher text which is obtained by enciphering the resultant third key using the second key, and then transmits the third cipher text to said second apparatus through said communication network;

said second apparatus deciphers the third key using the second key on the basis of the third cipher text, and also deciphers the written order using the resultant third key on the basis of the first cipher text, and authenticates the predetermined part of the written order by referring to the authentication information, and calculates a four cipher text which is obtained by enciphering the predetermined part of the written order using the second key, and then transmits both the authentication information and the fourth cipher text to said third apparatus; and said third apparatus deciphers the predetermined part of the written order using the second key on the basis of the fourth cipher text, and authenticates the predetermined part of the written order by referring to the authentication information.

2. An electronic shopping method according to claim 1, wherein the predetermined information of the written order is information to be notified to the credit card company, and the authentication information corresponds to a fifth cipher text which is obtained by enciphering the predetermined information using the first key by said first apparatus, and said third apparatus deciphers the predetermined information from the fourth cipher text using the second key, and also deciphers the predetermined information from the fifth cipher text using the first key, and judges whether or not the resultant two predetermined information matches each other, thereby authenticating the predetermined part of the written order.

3. An electronic shopping method in which by using a communication network to which a first apparatus for being operated by a user, a second apparatus associated with a retail store for providing information with respect to products to be purchased by the user, and a third apparatus associated with a credit card company for paying the prices for the products purchased by the user are connected, the user operates said first apparatus so as to transmit a written order that the user purchases the desired products to said second apparatus, and said second apparatus transmits at least predetermined information of the written order of interest to said third apparatus, said method comprises that:

both said first apparatus and said third apparatus hold a first key in common, and both said second apparatus and said third apparatus hold a second key in common;

said first apparatus calculates a first cipher text which is obtained by enciphering the written order exhibiting the products to be purchased using a third key selected at random, a digital signature for the written order carried out by using a secret key associated with said first apparatus, and a second cipher text which is obtained by enciphering the third key using the first key, and then transmits the first cipher text, the digital signature and the second cipher text to said second apparatus through said communication network;

said second apparatus transmits the second cipher text to said third apparatus;

said third apparatus deciphers the third key using the first key on the basis of the second cipher text, and calculates a third cipher text which is obtained by enciphering the resultant third key using the second key, and then transmits the third cipher text to said second apparatus through said communication network;

said second apparatus deciphers the third key using the second key on the basis of the third cipher text, and also deciphers the written order using the resultant third key on the basis of the first cipher text, and confirms the legality of the digital signature using a public key associated with said first apparatus, thereby authenticating the written order, and calculates a fourth cipher text which is obtained by enciphering the written order using the second key, and then transmits both the digital signature and the fourth cipher text to said third apparatus; and said third apparatus deciphers the written order using the second key on the basis of the fourth cipher text, and confirms the legality of the digital signature using the public key associated with said first apparatus, thereby authenticating the written order.

4. An electronic shopping method in which by using a communication network to which a first apparatus for being operated by a user, a second apparatus associated with a retail store for providing information with respect to products to be purchased by the user, and a third apparatus associated with a credit card company for paying the prices for the products purchased by the user are connected, the user operates said first apparatus so as to transmit a written order that the user purchases the desired products to said second apparatus, and said second apparatus transmits at least predetermined information of the written order of interest to said third apparatus, said method comprises that:

both said first apparatus and said third apparatus hold a first key in common, and both said second apparatus and said third apparatus hold a second key in common;

said first apparatus calculates a first cipher text which is obtained by enciphering a third key selected at random using first information which is obtained by only said first apparatus, and then transmits the first cipher text to said second apparatus through said communication network;

said second apparatus calculates a second cipher text which is obtained by enciphering the first cipher text using second information which is obtained by only said second apparatus, and then transmits the second cipher text to said first apparatus;

said first apparatus calculates a third cipher text which is obtained by enciphering the written order exhibiting the products to be purchased using the first key, a fourth cipher text which is obtained by enciphering a cipher text, from which the influence of the first information is removed, using the first key, and a fifth cipher text which is obtained by enciphering at least predetermined information in the written order using the second key, and then transmits the third cipher text, the fourth cipher text and the fifth cipher text to said second apparatus through said communication network;

said second apparatus transmits the fourth cipher text to said third apparatus;

said third apparatus calculates a sixth cipher text, from which the influence of the first key is removed, from the fourth cipher text, and then transmits the sixth cipher text thus obtained to said second apparatus;

said second apparatus deciphers the third key by removing the influence of the second information on the basis of the sixth cipher text, and also deciphers the written order using the resultant third key on the basis of the third information, and calculates a seventh cipher text which is obtained by enciphering predetermined information in the written order using the second key, and then transmits both the fifth cipher text and the seventh cipher text to said third apparatus; and said third apparatus deciphers the predetermined information using the second key on the basis of the seventh cipher text and also deciphers the predetermined information using the first key on the basis of the fifth information, and judges whether or not the resultant predetermined two information matches each other, thereby authenticating the predetermined part.

5. An electronic shopping method according to claim 4, wherein the first key, and a value (p−1) which is obtained by subtracting 1 from a prime number p as public information are prime each other;

said first apparatus selects the third key K so as to fulfill the condition of $0 \leq K < p$, and selects, as the first information, a first random number r fulfilling the condition of $0 \leq r < p-1$, and calculates the first cipher text $u = \exp(K: r) \mod p$, where $\exp(a: x)$ represents a to the x-th power, using both the third key and the first information;

said second apparatus selects, as the second information, a second random number s fulfilling the condition of $0 \leq s < p$, and calculates the second cipher text $r = \exp(u: s) \mod p$ using the second information;

said first apparatus calculates the fourth cipher text $w = \exp(v: K(A, C)/r) \mod p$;

said third apparatus calculates the sixth cipher text $w' = \exp(w: 1/K(A, C)) \mod p$; and said second apparatus deciphers the third key on the basis of an expression of $K = \exp(w': 1/s) \mod p$, and deciphers the written order using the resultant key.

6. An electronic shopping method in which by using a communication network to which a first apparatus for being operated by a user, a second apparatus associated with a retail store for providing information with respect to products to be purchased by the user, and a third apparatus associated with a credit card company for paying the prices for the products purchased by the user are connected, the user operates said first apparatus so as to transmit a written order that the user purchases the desired products to said second apparatus, and said second apparatus transmits at least predetermined information of the written order of interest to said third apparatus, said method comprises that:

both said first apparatus and said third apparatus hold a first key in common, and both said second apparatus and said third apparatus hold a second key in common;

said first apparatus calculates a first cipher text which is obtained by enciphering a third key selected at random using first information which is obtained by only said first apparatus, and then transmits the first cipher text to said second apparatus through said communication network;

said second apparatus calculates a second cipher text which is obtained by enciphering the first cipher text using second information which is obtained by only said second apparatus, and then transmits the second cipher text thus obtained to said first apparatus;

said first apparatus calculates a third cipher text C3 which is obtained by enciphering the written order $P = (P1, P2)$ including information P2 to be notified to a credit card company and information P1 other than the information P2 using the third key, and a fourth cipher text C4 which is obtained by enciphering a cipher text, which is obtained by removing the influence of the first information from the second cipher text C2, using the first key, and on the basis of a hash value $f(h(P1), P2)$ which is calculated using both one way hash functions $h(x)$ and $f(x, y)$ as public information, and calculates a digital signature $sgnA(P)$ for the hash value $f(h(P1), P2)$ using a secret key associated with said first apparatus, and then transmits the third cipher text C3, the fourth cipher text C4 and the digital signature $sgnA(P)$ to said second apparatus through said communication network;

said second apparatus transmits the fourth cipher text C4 to said third apparatus;

said third apparatus calculates a fifth cipher text C5 which is obtained by removing the influence of the first key from the fourth cipher text, and then transmits the fifth cipher text thus obtained to said second apparatus;

said second apparatus deciphers the third key by removing the influence of the second information on the basis of the fifth cipher text, and also deciphers the written order P using the resultant third key on the basis of the third information, and confirms the legality of the digital signature $sgnA(P)$ using a public key associated with said first apparatus, thereby authenticating the written order P, and calculates a sixth cipher text C6 which is obtained by enciphering predetermined information P2 in the written order using the second key, and then transmits the sixth cipher text, the digital signature $sgnA(P)$ and the hash value $h(P1)$ to said third apparatus; and said third apparatus deciphers the predetermined information P2 in the written order using the second key on the basis of the sixth cipher text, and confirms the legality of the digital signature $sgnA(P)$ using the public key associated with said first apparatus, the hash value $h(P1)$ and the predetermined information P2 in the written order, thereby authenticating the second information in the written order.

7. An electronic shopping method according to claim 6, wherein the first key, and a value (p−1) which is obtained by subtracting 1 from a prime number p as public information are prime each other;

said first apparatus selects the third key K so as to fulfill the condition of $0 \leq K < p$, and selects, as the first information, a first random number r fulfilling the condition of $0 \leq r < p-1$, and calculates the first cipher text $u = \exp(K: r) \mod p$, where $\exp(a: x)$ represents a to the x-th power, using both the third key and the first information;

said second apparatus selects, as the second information, a second random number e fulfilling the condition of $0 \leq s < p$, and calculates the second cipher text $r = \exp(u: s) \mod p$ using the second information;

said first apparatus calculates the fourth cipher text $w = \exp(v: K(A, C)/r) \mod p$;

said third apparatus calculates the sixth cipher text $w = \exp(w: 1/K(A, C)) \mod p$; and said second apparatus deciphers the third key on the basis of an expression of $K = \exp(w: 1/s) \mod p$, and deciphers the written order using the resultant key.

8. An electronic shopping method in which by using a communication network to which a first apparatus for being operated by a user, a second apparatus associated with a retail store for providing information with respect to products to be purchased by the user, and a third apparatus associated with a credit card company for paying the prices for the products purchased by the user are connected, the user operates said first apparatus so as to transmit a written order that the user purchases the desired products to said second apparatus, and said second apparatus transmits at least predetermined information of the written order of interest to said third apparatus, said method comprises that:

both said second apparatus and said third apparatus hold a second key in common;

said first apparatus calculates a first cipher text u which is obtained by enciphering a third key K, which is selected at random so as to fulfill the condition of $0 \leq K < p$ using first information as a first random number r fulfilling the condition of $0 \leq r < p-1$ on the basis of an expression of $u = \exp(K: r) \mod p$ where $\exp(a: x)$ represents a to the x-th power, and then transmits the first cipher text to said second apparatus through said communication network;

said second apparatus calculates a second cipher text v which is obtained by enciphering the first cipher text using second information as a second random number s fulfilling the condition of $0 \leq s < p$ on the basis of an expression of $v = \exp(u: s) \mod p$, and then transmits the second cipher text to said first apparatus;

said first apparatus calculates a third cipher text C3 which is obtained by enciphering the written order $P = (P1, P2)$ including predetermined information P2 to be notified to a credit card company and information P1 other than the predetermined information P2 using the third key, and a fourth cipher text w which is obtained by removing the influence of the first information from the second cipher text on the basis of an expression of $w = \exp(v: 1/r) \mod p$, and on the basis of a hash value $g(f(h(P1), P2), v, I)$ which is calculated using the second cipher text v, identification information I and one way hash functions $h(x)$, $f(x, y)$ and $g(x, y, z)$ as public information, and calculates a digital signature sgnA(P) for the hash value $g(f(h(P1), P2), v, I)$ using a secret key associated with said first apparatus, and then transmits the fourth cipher text, the identification information and the digital signature to said second apparatus through said communication network;

said second apparatus deciphers the third key on the basis of an expression of $K = \exp(w: 1/s) \mod p$, and also deciphers the written order using the resultant third key, and confirms the legality of the digital signature sgnA (P) using a public key associated with said first apparatus, thereby authenticating the written order P, and calculates a fifth cipher text which is obtained by enciphering the predetermined information P2 in the written order using the second key, and then transmits the fifth cipher text, the digital signature sgnA(P), the hash value h(P1) and the identification information I to the third apparatus; and said third apparatus deciphers the predetermined information P2 in the written order using the second key on the basis of the fifth cipher text, and confirms the legality of the digital signature sgnA(P) using the public key associated with said first apparatus, the hash value h(P1), and the predetermined information P2 in the written order, thereby authenticating the predetermined information in the written order.

9. An electronic shopping method in which by using a communication network to which a first apparatus for being operated by a user, a second apparatus associated with a retail store for providing information with respect to products to be purchased by the user, and a third apparatus associated with a credit card company for paying the prices for the products purchased by the user are connected, the user operates said first apparatus so as to transmit a written order that the user purchases the desired products to said second apparatus, and said second apparatus transmits at least predetermined information of the written order of interest to said third apparatus, said method comprises that:

both said second apparatus and said third apparatus hold a second key in common;

said first apparatus calculates a first cipher text which is obtained by enciphering the written order $P = (P1, P2)$ including predetermined information P2 to be notified to the credit card company and information P1 other than the predetermined information P2 using a third key selected at random and calculates a second cipher text w, which is defined by an expression of $w = \exp(K: eB) \mod nB$ where $\exp(a: x)$ represents a to the x-th power, using a public key (eB, nB) associated with said second apparatus, and also calculates a digital signature sgnA(P) for a hash value $f(h(P1), P2)$ using one way hash functions $h(x)$ and $f(x, y)$ as the public information and a secret key dA and a public key nA associated with said first apparatus in accordance with an expression of $sgnA(P) = \exp(f(h(P1), P2), dA) \mod nA$, and then transmits the resultant first cipher text, second cipher text and digital signature sgnA(P) to said second apparatus through said communication network;

said second apparatus deciphers the third key using a secret key dB associated with said second apparatus in accordance with an expression of $K = \exp(w: dB) \mod nB$, and also deciphers a document P using the resultant third key on the basis of the first cipher text, and confirms that an expression of $f(h(P1), P2) = \exp(sgnA(P): eA)(\mod nA)$ is established using a public key (eA, nA) associated with said first apparatus, thereby authenticating the document P, and calculates a third cipher text which is obtained by enciphering predetermined information in the document P using the second key, and then transmits the third cipher text, the hash value h(P1) and the digital signature sgnA(P) to said third apparatus; and said third apparatus deciphers the predetermined information in the written order using the second key on the basis of the third cipher text, and confirms that an expression of $f(h(P1), P2)=\exp(sgnA(P); eA)(\mod nA)$ is established using the public key (eA, nA) associated with said first apparatus, thereby authenticating the predetermined information in the written order.

10. An electronic shopping system including a first apparatus for being operated by a user, a second apparatus associated with a retail store for providing information with respect to products to be purchased by the user, a third apparatus associated with a credit card company for paying the prices for the products purchased by the user, and a communication network to which said first, second and third apparatuses are connected, the user operating said first apparatus so as to transmit a written order that the user purchases the desired products to said second apparatus, said second apparatus transmitting at least predetermined information of the written order to said third apparatus, both said first apparatus and said third apparatus holding a first key in common, both said second apparatus and said third apparatus holding a second key in common, said first apparatus including first enciphering/deciphering means for enciphering desired information using both the first key and a third key selected at random or deciphering the enciphered information on the basis of predetermined information, and first transmission/reception means for transmitting/receiving information to/from said second apparatus, said second apparatus including second enciphering/deciphering means for enciphering predetermined information using the second key or deciphering the enciphered information on the basis of predetermined information, and second transmission/reception means for transmitting/receiving information to/from said first apparatus and said third apparatus, said third apparatus including third enciphering/deciphering means for enciphering predetermined information using both the first key and the second key or deciphering the enciphered information on the basis of predetermined information, and third transmission/reception means for transmitting/receiving predetermined information to/from said second apparatus, wherein:

said first enciphering/deciphering means of said first apparatus produces a first cipher text which is obtained by enciphering the written order exhibiting the products to be purchased by the user using the third key selected at random, and a second cipher text which is obtained by enciphering the third key using the first key;

said third enciphering/deciphering means of said third apparatus deciphers the third key using the first key on the basis of the received second cipher text, and calculates a third cipher text which is obtained by enciphering the resultant third key using the second key; and said second enciphering/deciphering means of said second apparatus deciphers the third key using the second key on the basis of the third cipher text and also deciphers the written order using the resultant third key on the basis of the first cipher text, thereby obtaining the written order, and wherein said first means includes authentication information calculating means for calculating authentication information relating to at least a predetermined part of the written order;

said second apparatus includes verification means for verifying the legality of the predetermined part of the written order by referring to the received authentication information, and calculates a fourth cipher text which is obtained by enciphering the predetermined part of the written order, which is obtained by the operation of said second enciphering/deciphering means, using the second key; and said third apparatus deciphers the predetermined part of the written order using the second key on the basis of the fourth cipher text, and authenticates the predetermined part of the written order by referring to the authentication information.

11. A document authenticating method in which a digital signature for a certain document P is calculated using a secret key associated with a signature producing person, and at least a plurality of signature verifiers confirm the legality of the digital signature using a public key associated with the signature producing person, thereby authenticating the document P, said method comprises that:

on the side of the signature producing person, a hash value $f(h(P1), P2)$ for the document $P=(P1, P2)$ containing a first part P1 and a second part P2 is calculated using one way hash functions $h(x)$ and $f(x, y)$ as public information, and a digital signature sgnA(P) for the hash value $f(h(P1), P2)$ is calculated using a secret key associated with the signature producing person, and both the document and the digital signature sgnA(P) are transmitted to the side of the signature verifiers;

on the side of a first signature verifier, the legality of the digital signature sgnA(P) is confirmed using both a public key associated with the signature producing person and the document P, thereby authenticating the document P;

the hash value h(P1), the second part P2 and the digital signature sgnA(P) are supplied to the side of a second signature verifier; and on the side of the second signature verifier, the legality of the digital signature sgnA(P) is confirmed using the public key associated with the signature producing person, the hash value h(P1) and the second part P2 in the document P, thereby authenticating

* * * * *